US007391043B2

(12) United States Patent
Ehrhardt, Jr.

(10) Patent No.: US 7,391,043 B2
(45) Date of Patent: Jun. 24, 2008

(54) SELF CALIBRATING MEDIA EDGE SENSOR

(75) Inventor: Robert A. Ehrhardt, Jr., Palatine, IL (US)

(73) Assignee: ZIH Corp., Hamilton (BM)

( * ) Notice: Subject to any disclaimer, the term of this patent is extended or adjusted under 35 U.S.C. 154(b) by 352 days.

(21) Appl. No.: 11/047,321

(22) Filed: Jan. 28, 2005

(65) Prior Publication Data

US 2005/0190368 A1 Sep. 1, 2005

Related U.S. Application Data

(60) Provisional application No. 60/481,974, filed on Jan. 30, 2004.

(51) Int. Cl.
*G01N 21/00* (2006.01)
*G01N 21/86* (2006.01)
*G01N 21/89* (2006.01)

(52) U.S. Cl. ............................ 250/559.36; 250/559.29; 250/559.39; 356/429; 356/614; 356/637; 271/3.13; 271/265.01; 271/265.02; 271/265.03; 400/706; 400/708

(58) Field of Classification Search ................. 250/221, 250/222.1, 559.29, 559.36, 559.39; 356/614, 356/429, 637, 625, 635; 271/3.13, 265.01–265.03; 400/703, 706, 708; 347/14, 19
See application file for complete search history.

(56) References Cited

U.S. PATENT DOCUMENTS 3,425,346 A 2/1969 Voight et al.
3,484,614 A 12/1969 Tobey et al.
3,493,457 A 2/1970 Jugler
3,889,111 A 6/1975 Moss
3,997,780 A 12/1976 Waehner
4,019,619 A 4/1977 Emenaker
4,074,130 A 2/1978 Messman et al.
4,121,716 A 10/1978 Luperti et al.

(Continued)

FOREIGN PATENT DOCUMENTS

EP 0015553 9/1980

(Continued)

OTHER PUBLICATIONS

International Search Report from corresponding International Applciation No. PCT/US2005/002635 dated Jan. 28, 2005.

*Primary Examiner*—Davienne Monbleau
(74) *Attorney, Agent, or Firm*—Alston & Bird LLP

(57) ABSTRACT

Various edge detection arrangements are disclosed, including an edge detection method and arrangement that utilizes outputs of commonly illuminated reference and edge sensors as the inputs for a comparator. The reference sensor is configured to have a wide field of view and the edge sensor is configured to have a narrow, high gain, field of view. Therefore, the reference sensor has a broad signal response to an edge passage and the edge sensor a steep and narrow signal response. When the two signals are biased to cross each other, the comparator output changes state, indicating passage of an edge. Because the reference sensor provides a base signal level directly related to the real time illumination level that the edge sensor also receives, the reference sensor provides a switch point along the transition ramp of the edge sensor that integrates a majority of the random error sources.

22 Claims, 20 Drawing Sheets

U.S. PATENT DOCUMENTS

| | | | | |
|---|---|---|---|---|
| 4,132,583 | A | 1/1979 | Hodgson | |
| 4,142,105 | A * | 2/1979 | Erdmann | 250/548 |
| 4,184,080 | A * | 1/1980 | Massey | 250/548 |
| 4,375,190 | A | 3/1983 | Quinci et al. | |
| 4,420,747 | A | 12/1983 | Kistner | |
| 4,470,349 | A | 9/1984 | Godlewski | |
| 4,544,287 | A | 10/1985 | Teraoka | |
| 4,685,815 | A | 8/1987 | Baranyi | |
| 4,699,531 | A | 10/1987 | Ulinski, Sr. et al. | |
| 4,795,281 | A | 1/1989 | Ulinski, Sr. et al. | |
| 4,844,629 | A | 7/1989 | Hoyt | |
| 4,905,590 | A | 3/1990 | Nobile | |
| 4,953,994 | A | 9/1990 | Shiozaki et al. | |
| 4,997,508 | A | 3/1991 | Shinno et al. | |
| 5,000,812 | A | 3/1991 | Murphy | |
| 5,002,410 | A | 3/1991 | Yajima | |
| 5,010,766 | A | 4/1991 | Typpo | |
| 5,064,300 | A | 11/1991 | Kashiwaba | |
| 5,069,562 | A | 12/1991 | Matsuda | |
| 5,087,925 | A | 2/1992 | No et al. | |
| 5,118,209 | A | 6/1992 | Bennet et al. | |
| 5,136,144 | A | 8/1992 | Swinton et al. | |
| 5,150,130 | A | 9/1992 | Sato | |
| 5,188,028 | A | 2/1993 | Reichel | |
| 5,193,918 | A | 3/1993 | Lohrmann et al. | |
| 5,204,537 | A | 4/1993 | Bennet et al. | |
| 5,266,967 | A | 11/1993 | Maslanka et al. | |
| 5,401,352 | A | 3/1995 | Matsushita et al. | |
| 5,437,228 | A | 8/1995 | Uland | |
| 5,438,349 | A | 8/1995 | Fox et al. | |
| 5,486,063 | A | 1/1996 | Fox et al. | |
| 5,507,583 | A | 4/1996 | Beaty et al. | |
| 5,521,627 | A | 5/1996 | Keung et al. | |
| 5,523,644 | A | 6/1996 | Witehira | |
| 5,524,996 | A | 6/1996 | Carpenter et al. | |
| 5,564,846 | A | 10/1996 | Katsumata | |
| 5,613,790 | A | 3/1997 | Maizga | |
| 5,650,730 | A | 7/1997 | Herbst, Jr. et al. | |
| 5,803,635 | A | 9/1998 | Austin et al. | |
| 5,978,004 | A | 11/1999 | Ehrhardt | |
| 6,027,265 | A | 2/2000 | Parker et al. | |
| 6,172,688 | B1 | 1/2001 | Iwasaki et al. | |
| 6,314,054 | B1 | 11/2001 | Priebsch | |
| 6,375,296 | B1 | 4/2002 | McGarry et al. | |
| 6,421,073 | B1 | 7/2002 | Hauslaib et al. | |
| 6,498,646 | B1 * | 12/2002 | Typpo et al. | 356/429 |
| 7,122,781 | B2 * | 10/2006 | Rotzoll et al. | 250/221 |
| 7,131,782 | B2 * | 11/2006 | Jung | 400/709 |

FOREIGN PATENT DOCUMENTS

| | | | |
|---|---|---|---|
| EP | 0265208 | A | 4/1988 |
| EP | 0694410 | A | 1/1996 |
| EP | 0699608 | A | 3/1996 |
| FR | 2274507 | A | 1/1976 |
| FR | 2807395 | A | 10/2001 |

* cited by examiner $$\frac{(V_{offset} - V_1)}{(V_2 - V_1)} = \frac{(D_{offset} - D_{e1})}{(D_{e2} - D_{e1})}$$

MEDIA SENSOR CALIBRATION LOGIC DIAGRAM

TO FIG. 15B

MEDIA SENSOR CALIBRATION LOGIC DIAGRAM (CONTINUE)

SELF CALIBRATING MEDIA EDGE SENSOR

CROSS REFERENCE TO RELATED APPLICATIONS

This application claims priority from U.S. provisional application Ser. No. 60/481,974 filed Jan. 30, 2004, which is titled "Self Calibrating Media Edge Sensor," and which is hereby incorporated by reference.

BACKGROUND OF INVENTION

1. Field of the Invention

The present invention relates to media sensors. More specifically, the present invention provides methods and arrangements for media edge sensors useful, for example, in a label printer.

2. Description of Related Art

Edge detection is used for identifying the passage of leading and or trailing edges of media as a means for counting and or accurate spatial registration of operations to be performed upon desired areas of the media. For example, label printers pass an array of labels releasably adhered to a support web past a printhead. An emitter and a detector pair are positioned on either side of the support web to detect changes in the web transmissivity between areas of the web covered by a label and the areas of uncovered web between each label. When the transmissivity changes from high to low or vice versa, a signal is transmitted to the printer processor indicating that a label edge has been detected. Thereby, accurate spatial orientation of printed indicia upon each label is enabled.

Some prior edge sensors have used an aperture to localize the emitter output and or mask the detector as a means for increasing the rate of change between a high transmissivity and a low transmissivity state, as a label edge passes the detector. As shown in FIG. 1, because of light scattering that occurs in the web, even if an aperture is used, a sharply defined transition does not occur. Noise generated in part by the presence of paper fibers or other non-uniformities in the web and or labels introduces a further random error to the detector by varying the point, relative to the actual edge location, at which a preset transition threshold signal level is detected.

The emitter, detector, aperture and their precise placement with respect to each other introduces further opportunity for variability of the sensor response characteristics. Performance characteristics of sensor components may vary batch to batch as the different components are received from a single or multiple suppliers and over time as component sensitivity and or output levels degrade. Further, environmental fouling of the emitter, aperture and or detector will degrade sensor circuit response characteristics over time.

Alternatively, edge detection may be performed by illuminating the back of the web and detecting the reflectivity changes caused by passage of, for example, a black mark placed on the back of the web, relative to a label edge. Black marks may also be used to indicate approach of a media run-out condition. However, reflectivity and diffusion variances in the web and or printed marks can still create similar signal response random error characteristics as noted above. Furthermore, different placements and performance characteristics of sensor components from batch to batch, and environmental fouling of such components over time, can also still degrade sensor circuit response characteristics.

Nonetheless, users expect label and other such printers and devices to function with a wide range of different media and support web combinations having a wide range of transmissivity and or light scattering characteristics. Therefore, it is an object of the present invention to provide methods and apparatuses that overcome such deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

SUMMARY OF THE INVENTION

Figure 1:
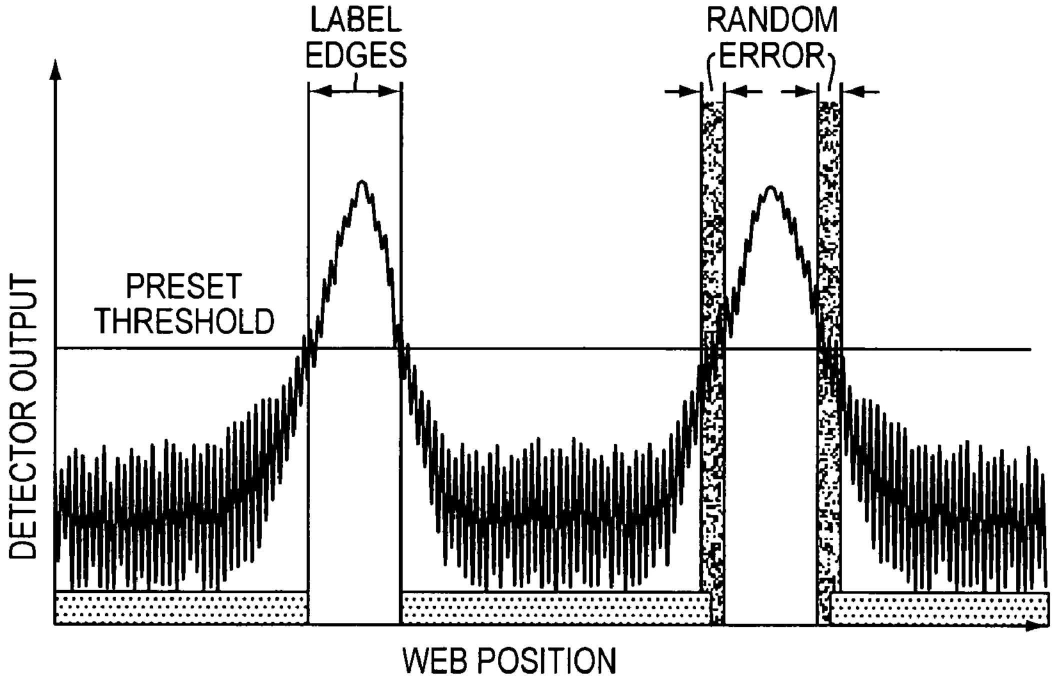
FIG. 1 is a representative signal response chart for a typical prior art emitter/aperture/detector media edge transmissivity sensing configuration.

The present invention seeks to provide media edge detection arrangements which function with a wide range of different media and support web combinations having a wide range of transmissivity and or light scattering characteristics.

In one embodiment of the present invention, an edge detector for detecting passage of media transition edges of a moving web which change the energy transmissivity of the web is described that includes a first emitter positioned to emit energy through the web towards a reference sensor and an edge sensor; the reference sensor having a reference sensor output corresponding to an energy level received from the first emitter; the edge sensor having an edge sensor output corresponding to an energy level received from the first emitter; the reference sensor having a broader field of view than the edge sensor in the direction of the advancing media; and the reference sensor output and the edge sensor output coupled to a comparator having a first output when the reference sensor output is greater than the edge sensor output and a second output when the reference sensor output is less than the edge sensor output, wherein a transition between the first and second outputs of the comparator marks the passage of a media transition edge.

In another embodiment of the present invention, an edge detector for detecting passage of media transition edges of a moving web which change the energy transmissivity of the web is described that includes an emitter located proximate a reference sensor and an edge sensor whereby energy emitted from the emitter is reflected by the web towards the reference sensor and the edge sensor; the reference sensor having a reference sensor output corresponding to an energy level received from the emitter; the edge sensor having an edge sensor output corresponding to an energy level received from the emitter; the reference sensor having a broader field of view than the edge sensor in the direction of the advancing media; and the reference sensor output and the edge sensor output coupled to a comparator having a first output when the reference sensor output is greater than the edge sensor output and a second output when the reference sensor output is less than the edge sensor output, wherein a transition between the first and second outputs of the comparator marks the passage of a media transition edge.

In yet another embodiment of the present invention, a method for detecting a media edge in a media path is described that includes the steps of adjusting a reference sensor to have a broader field of view with respect to the media path than an edge sensor; illuminating the edge sensor and the reference sensor across the media path; and comparing an output of the edge sensor with an output of the reference sensor.

In yet another embodiment of the present invention, a system and method for detecting passage of transition edges of a moving web which change the energy transmissivity of the web is described that includes an emitter positioned to emit energy through the web towards a sensor; the sensor having a sensor output corresponding to an energy level received from the emitter; a signal conditioning module for amplifying and shifting the sensor output from the sensor so as to normalize the sensor output to a certain range of levels for detection; an edge sensing module for controlling detection of transition edges in the web, the detection based at least in part on the normalized sensor output of the signal conditioning module; and a processor that is connected to communicate with the signal conditioning module and the edge sensing module, the processor configured for: determining, based at least in part on the normalized sensor output of the signal conditioning module, a label signal level and an inter-label gap signal level corresponding, respectively, to a label portion and an inter-label gap portion of the web; setting a label/inter-label gap threshold between the label and inter-label gap signal levels; and detecting when the normalized sensor output of the signal conditioning module crosses the label/inter-label gap threshold.

In still another embodiment of the present invention, a system for detecting passage of transition edges of a moving web which change the energy transmissivity of the web is described that includes a collimated light source, such as a vertical cavity surface emitting laser (VCSEL) or side emitting laser positioned to emit energy through the web towards a sensor; the sensor having a sensor output corresponding to an energy level received from the emitter; a signal conditioning module for normalizing the sensor output to a certain range of levels for detection; an edge sensing module for controlling detection of transition edges in the web, the detection based at least in part on the normalized sensor output of the signal conditioning module; and a processor connected to communicate with the signal conditioning module and the edge sensing module, the processor configured for: determining, based at least in part on the normalized sensor output of the signal conditioning module, a label signal level and an inter-label gap signal level corresponding, respectively, to a label portion and an inter-label gap portion of the web; setting a label/inter-label gap threshold between the label and inter-label gap signal levels; and detecting when the normalized sensor output of the signal conditioning module crosses the label/inter-label gap threshold.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention utilizes outputs of commonly illuminated reference and edge sensors as the inputs for a comparator. The reference sensor is configured to have a wide field of view and the edge sensor is configured to have a narrow, high gain, field of view. Therefore, the reference sensor has a broad signal response to an edge passage and the edge sensor a steep and narrow signal response. When the two signals are biased to cross each other, the comparator output changes state, indicating passage of an edge. Because the reference sensor provides a base signal level directly related to the real time illumination level that the edge sensor also receives, the reference sensor provides a switch point along the transition ramp of the edge sensor that integrates a majority of the random error sources. Therefore, the comparator output is self-calibrating for a wide range of different media transmissivities, the presence, on average, of embedded fibers within the web and varying sensor component output and or sensitivity.

Figure 2:
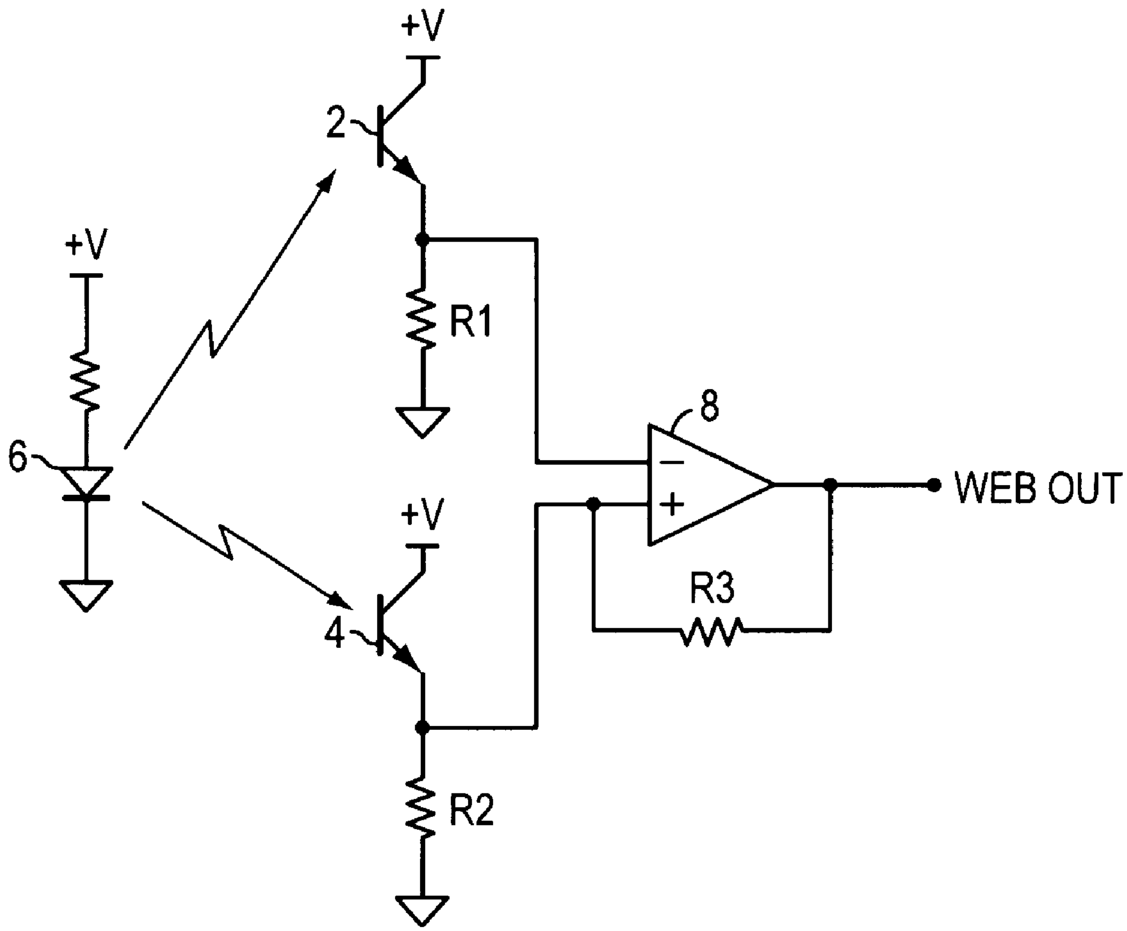
FIG. 2 is a simplified electrical schematic of a first embodiment of the invention.

A first embodiment of the invention uses an energy emitter that illuminates, through the media, a reference sensor 2 and an edge sensor 4. A simplified electrical schematic of the sensor circuit is shown in FIG. 2. The reference sensor 2 and the edge sensor 4 sense the first emitter 6 output passing through the web between each label. The output of each sensor is input to a comparator 8 that switches state when the edge signal level exceeds the reference signal level. To ensure that the steady state "high" reference signal level is below the edge signal "high" level, a bias may be introduced via modifications to the aperture dimensions and or adjusting components. In one embodiment, as illustrated in FIG. 2, the bias may be introduced by adjusting a pair of pull-down resistor values so that R1 is larger than R2. More generally, however, the bias can be introduced in a variety of ways including deliberate sensor mismatching, differences in corresponding parts (e.g., pull-down resistor values, etc.) or other bias sources. Also, when using A/D converter(s), for example, the bias can be introduced in the related software. The bias, which can be introduced in any of these ways, as well as others not currently listed, helps to eliminate spurious output when both sensors 2, 4 see label only.

Figure 3:
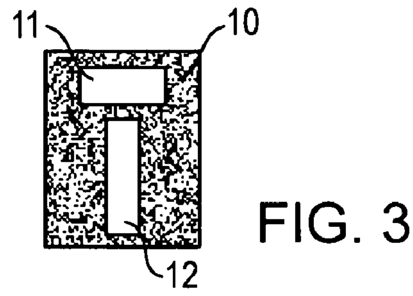
FIG. 3 is a schematic view of an aperture mask.

As shown by FIG. 3, a mask 10 with a reference aperture 11 arranged perpendicular to an edge aperture 12 may be used to provide the reference sensor 2 with a wide view and the edge sensor 4 with a narrow, high gain, view of the first emitter 6 output passing through the web 13. Alternatively, the apertures 11,12 may be formed in mask(s) individual to each sensor 2,4. Also, the masks may be integrated with each sensor, and the sensors mounted so that the apertures 11,12 are perpendicular to each other. Where the first emitter 6 is an infrared or visible light emitting diode (LED), the reference sensor 2 and the edge sensor 4 may be, for example, photo transistors or photo diodes. Alternatively, any form of energy emitter and corresponding sensors capable of generating output signals proportional to the energy levels received may be used.

Figure 4A:
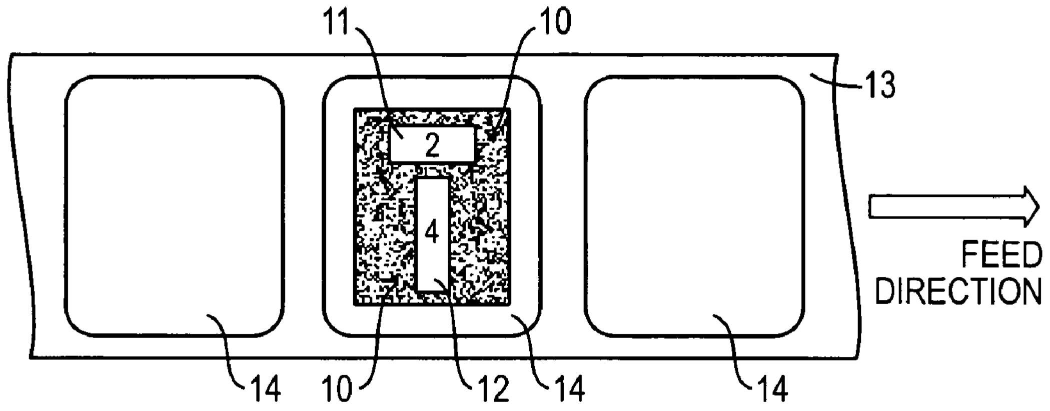
FIG. 4*a* is a schematic top view representation of the aperture mask of FIG. 3, relative to a web showing a condition during media feed where both apertures are covered by a label.
Figure 4B:
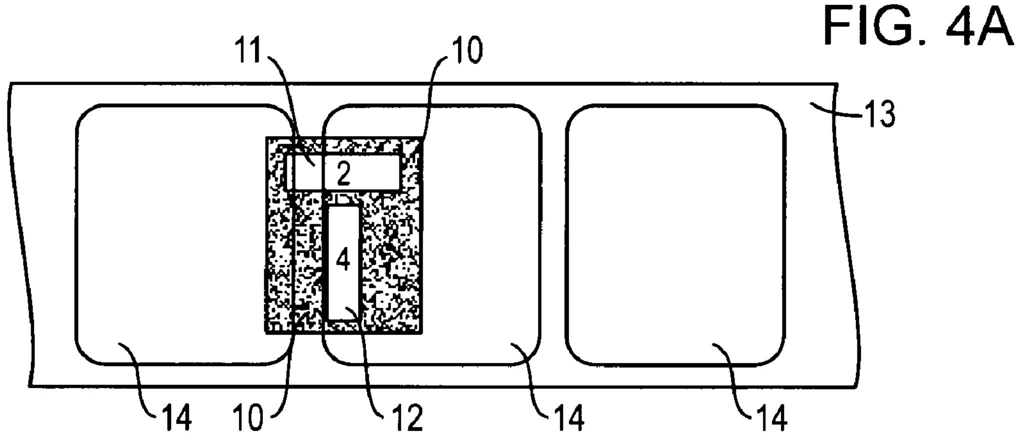
FIG. 4*b* is a schematic top view representation of the aperture mask of FIG. 3, relative to a web showing a condition during media feed where the reference aperture is exposed to a label edge, but the edge aperture is not.
Figure 4C:
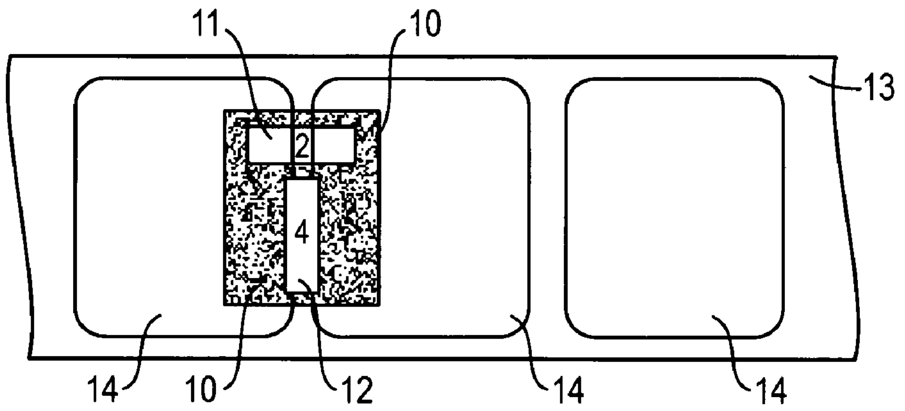
FIG. 4*c* is a schematic top view representation of the aperture mask of FIG. 3, relative to a web showing a condition during media feed where both apertures are ex-posed to a label edge.
Figure 5:
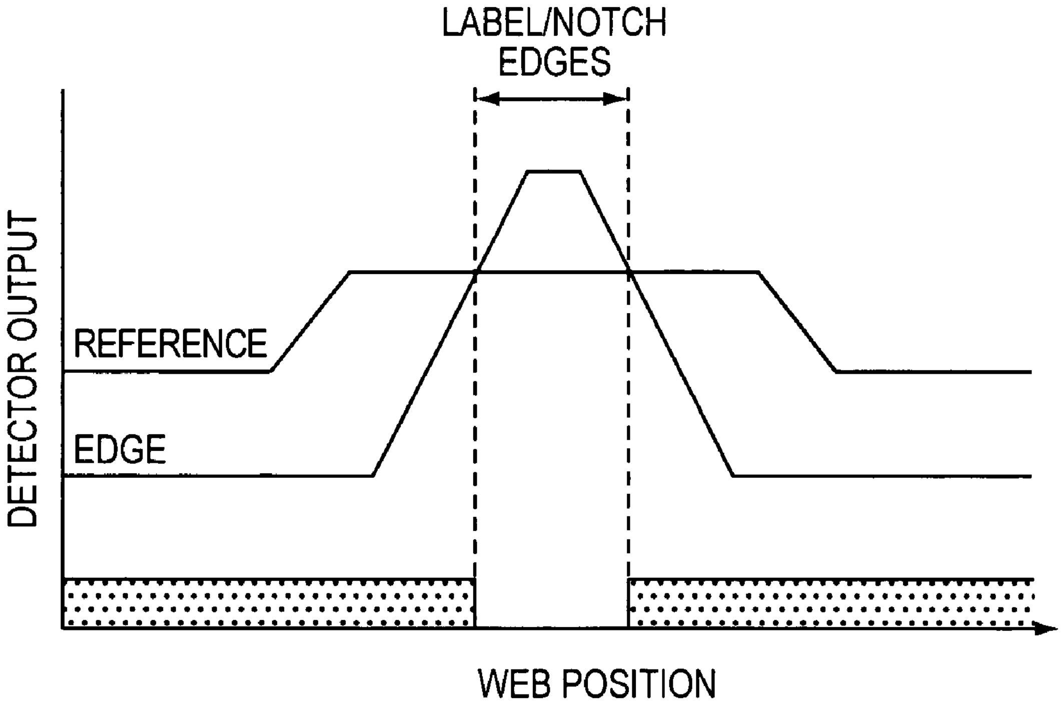
FIG. 5 is a representative signal response chart for an edge sensing circuit according to a first embodiment of the invention.

As the media 13 moves past the reference sensor 2, and edge sensor 4 (both covered by mask 10), when both sensors are covered by a label 14, as shown in FIG. 4*a*, both sensors will have a low output level, the reference sensor 2 having a low level biased to be above that of the edge sensor 4. As a space between label(s) 14 approaches the sensors 2,4, as shown in FIG. 4*b*, the reference aperture 11 aligned parallel to the feed direction, becomes illuminated before the edge aperture 12 whereby the reference sensor 2 output rises before a significant increase occurs at the edge sensor 4. When the edge aperture 12 is finally illuminated, as shown in FIG. 4*c*, the edge sensor 4 output level rises quickly, passing through the signal level of the reference sensor 2, triggering the comparator 8 to change state and signal the processor that an edge has been detected. The signal level progression, with respect to the media location is shown in chart form in FIG. 5.

Figure 6:
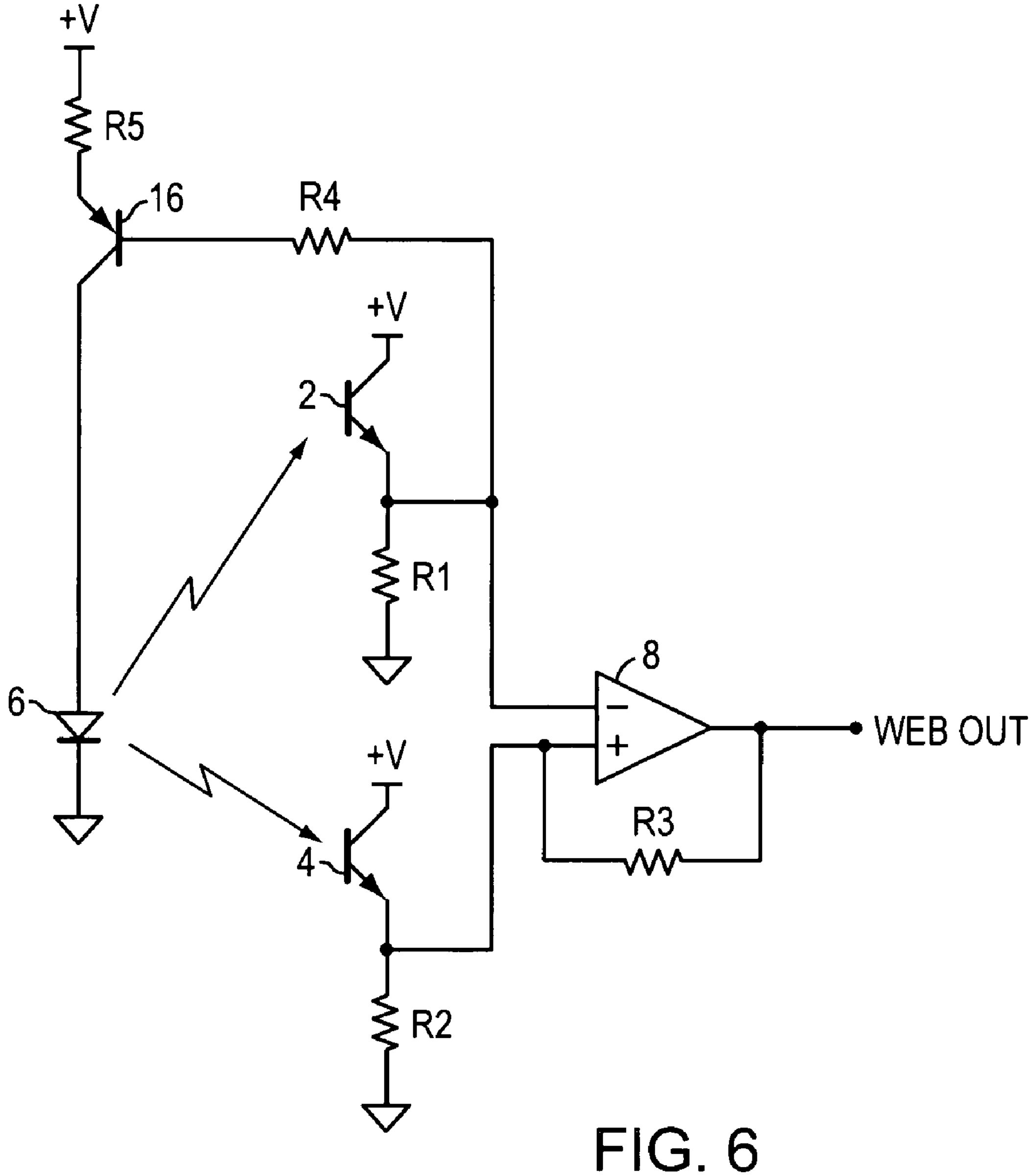
FIG. 6 is a simplified electrical schematic of a first embodiment of the invention with emitter current feed-back control.
Figure 7:
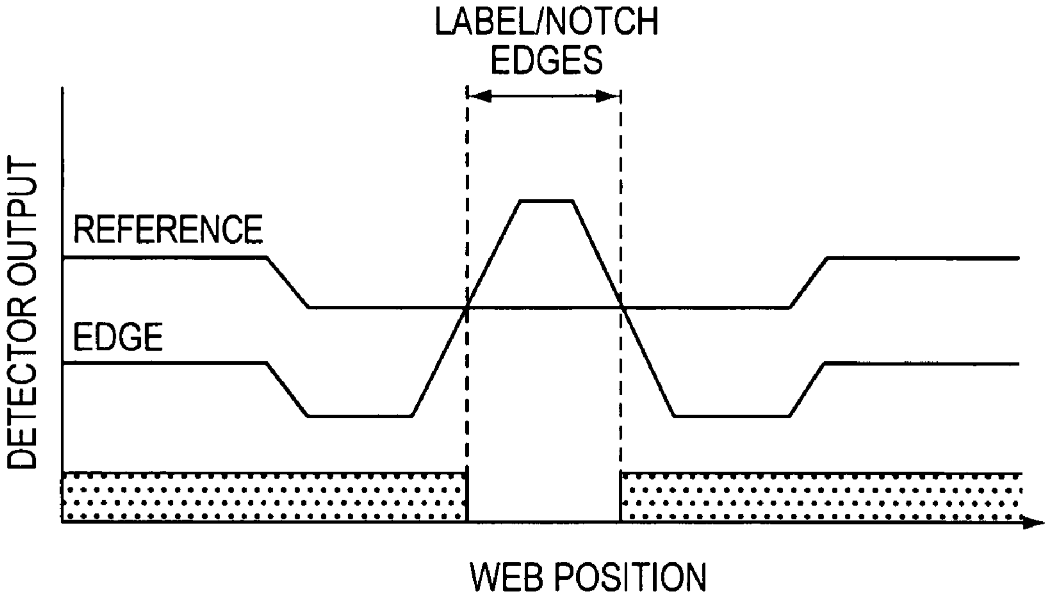
FIG. 7 is a representative signal response chart for an edge sensing circuit according to a first embodiment of the invention with emitter current feedback control.

An increased range of media transmissivities usable with the system, as well as compensation for lowered LED light output that may occur over time may be built into the sensor circuit, to a certain extent, by linking the reference sensor output to the current level delivered to the first emitter 6 LED. As shown in FIG. 6, the reference sensor 2 output may be tied to a transistor 16. If the reference sensor 2 output decreases, transistor 16 increases the current to the first emitter 6 LED. The additional closed loop of this arrangement modifies the overall signal level progression, as shown in FIG. 7, but the end result output from the comparator 8 to the printer processor is the same.

Figure 8A:
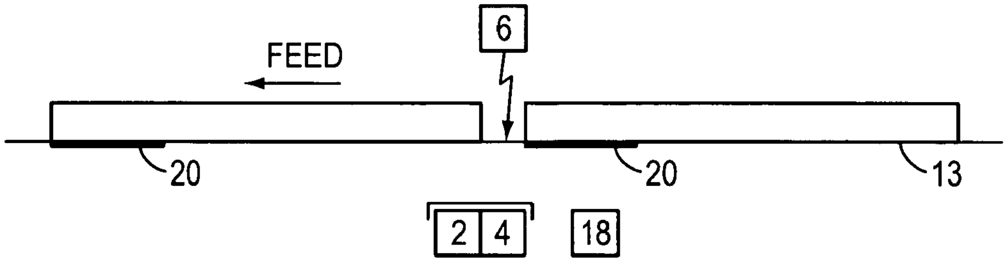
FIG. 8A is a schematic side view representation of the invention component positioning for a second embodiment, relative to a web.

A second embodiment of the invention is selectable between dual modes. In a first mode, the circuit operates as described above, monitoring web transmissivity changes resulting from spaces between labels. In a second mode, the circuit monitors web reflectivity changes resulting from passage of black mark(s) 20 placed on the back side of the web. As shown in FIG. 8A, to add the second mode, a second emitter 18 is located proximate the edge sensor 2 and the reference sensor 4 to illuminate the sensor side of the web 13. If closed loop feedback is used for the first emitter 6 supply current level as described herein above, the second emitter 18 may be similarly configured.

Figure 8B:
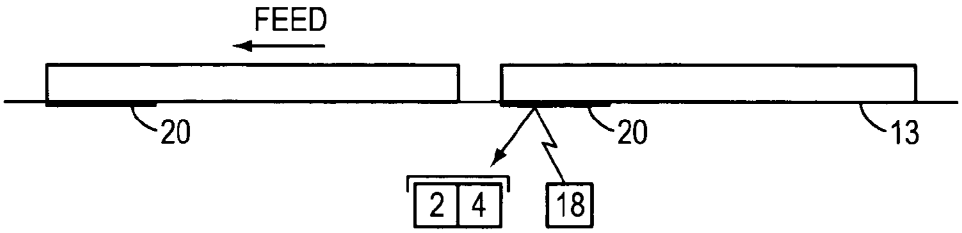
FIG. 8B is a schematic side view representation of the invention component positioning for a third embodiment, relative to a web.

A third embodiment of the invention includes a "reflective-only" version. As shown in FIG. 8B, this embodiment does not require the presence of the emitter 6. Thus, rather than being selectable between dual modes, the circuit need only be configured to monitor web reflectivity changes resulting from the passage of black mark(s) 20 placed on the back side of the web. To do so, the emitter 18, as shown in FIG. 8B, is located proximate the edge sensor 2 and the reference sensor 4 to illuminate the sensor side of the web 13. As with the other embodiments, closed loop feedback can be used for the emitter 18 supply current level as described herein above.

Figure 9:
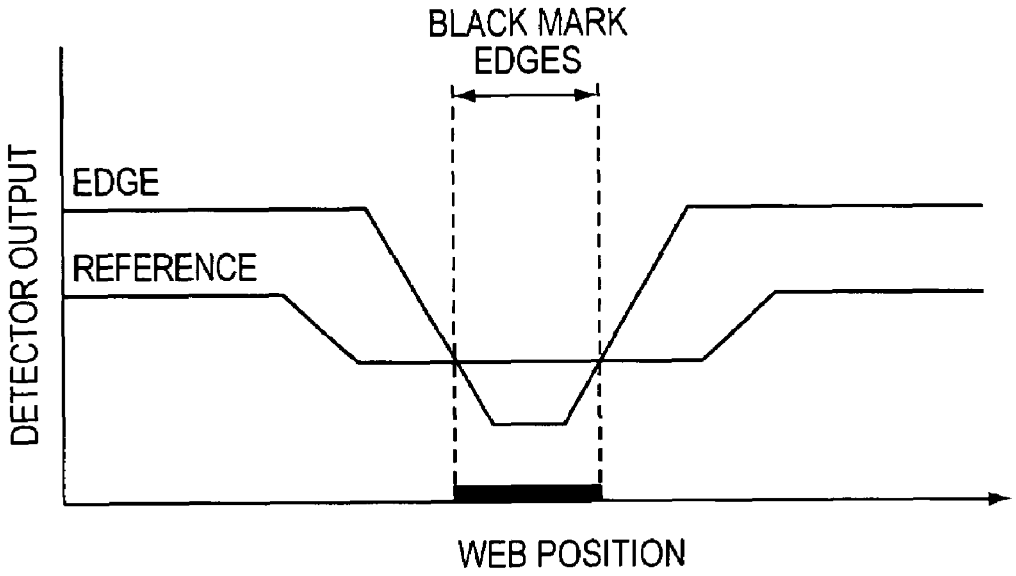
FIG. 9 is a representative signal response chart for an edge sensing circuit according to a second embodiment of the invention in black mark detecting mode.

With the circuit in black mark detecting mode, the first emitter 6 is disabled and the second emitter 18 is energized. As shown by the signal level progression in FIG. 9, the circuit operates with an inverted steady state as both the reference sensor 2 and the edge sensor 4 receive the second emitter 18 output reflection from the web, causing elevated reference sensor 2 and edge sensor 4 outputs. When a black mark 20 approaches, the resulting lowered reflection from the web is first detected by the wider viewing reference sensor 2 causing a drop in the reference sensor 2 output level. When the black mark 20 reaches the view of the edge sensor 4, the edge sensor 4 output drops below the level of the reference sensor 2, and the comparator 8 changes state to indicate detection of the black mark 20. Here also, the reference sensor 2 generates a base signal level directly related to the real time illumination level that the edge sensor 4 also receives, providing a switch point along the transition ramp of the edge sensor 4 that integrates a majority of the random error sources. Therefore, the comparator 8 output is self-calibrating for different media 13 reflectivities and second emitter 18 output variances.

One skilled in the art will appreciate that the reference and edge sensors may be arranged with or without apertures and in different orientations with respect to each other. Similarly, rather than using apertures as filters for the emitter output, cylinder lenses may be used to shape the emitter output directed to each sensor. According to the invention, it is only necessary that one of the two sensors react to the approach of a transition edge before the other so that it may assume a signal output level which the other will traverse, providing a self calibrating signal level transition which a comparator then operates upon.

The self-calibrating media edge sensor arrangement described above has been demonstrated in detail with respect to a label printer. However, other applications of the invention will be readily apparent to one skilled in the art for many types of media having a moving web with transition edges including, for example, photographic negative frame detection and or monitoring of alignment indicia used in offset web printing processes.

Further, the self-calibrating media edge sensor arrangement described above has been demonstrated with respect to a semiconductor comparator element. One skilled in the art will appreciate that a comparator function according to the invention may also be achieved, for example, through the use of AID converter(s) and logical comparison of the signal levels within a computer processor. In one embodiment, the comparator can include a pair of A/D converters, one of which is used for sampling the output of the reference sensor and the other for sampling the output of edge sensor. The comparator can further include a processor coupled to the pair of A/D converters which generates either a first output or a second output by logically comparing the outputs of the A/D converters. In another embodiment, the comparator can include a single A/D converter with a multiplexer used for taking alternate readings from each of the reference sensor and the edge sensor. A processor coupled to such A/D converter can then be used to generate either a first output or a second output by logically comparing respective reference sensor and edge sensor readings taken by the A/D converter.

Thus, the media edge sensor arrangement described above provides an extremely accurate self calibrating edge detection circuit comprising a minimal number of physical components and little or no requirement for host logical processing overhead.

Other media edge sensor arrangements are also contemplated by the present invention. As indicated above, transmissive media sensors allow a printer, or other such device, to determine the start of each label for vertical image registration, and to determine when the media supply has been exhausted. Transmissive media sensors work with media of two general types: opaque (or nearly opaque) media with notches or holes, and partially opaque media with areas of less opacity between labels. Examples of these two types of media are card stock with notches, and die cut labels on a continuous liner. The opacity profile of the first type of media as it moves through the sensor is 100% opacity during the label with short periods of 0% opacity during the notch or hole. The opacity profile of the second type of media as it moves through the sensor is some opacity amount (A %) during the label with short periods of less opacity (B %) during the inter label gap. In both types, the opacity seen by the sensor is 0% when the media is exhausted. The ranges of the opacities, A % and B %, can be very wide (e.g. from nearly 0% to 100%), and the range of difference between label and gap opacity (A %-B %) can also be wide.

Figure 10:
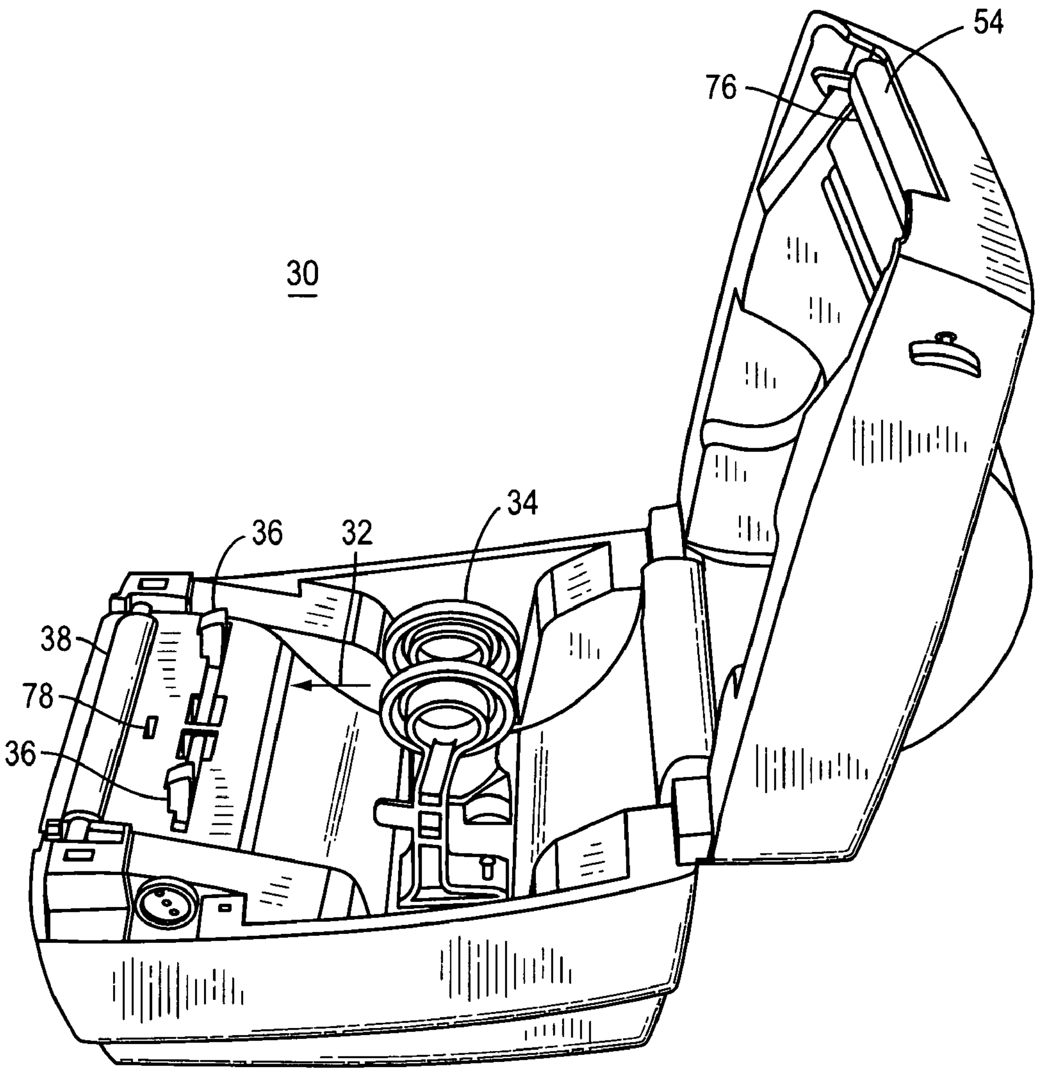
FIG. 10 illustrates a media edge detection arrangement positioned along a feed path defined by a printer in accordance with an embodiment of the present invention.

Media edge sensor configurations in accordance with the present invention can be used in a wide variety of devices including various types of thermal printers. For instance, FIG. 10 shows a typical example of a label printer 30 having a feed path 32, which is of a type that could be used in accordance with the present invention. Specifically, the label printer 30 is a direct thermal transfer printer where no ribbon is required. As is known in the art, printing is performed by selective heating of a printhead element on the media to create the image applied to each label. In this printer, a roll of media 13 (not shown) is placed on the spindles 34 and is fed through the adjustable guides 36 and over the platen roller 38. The printer further includes a printhead 54 for printing on the media 13 when, in operation, the cover is closed so the printhead is brought into contact with the media as the media lays over the platen 38. The platen 38 advances the media 13 while the printhead 54 selectively heats the media to produce the image applied to each label.

To monitor the opacity profile of the media 13 moving along the feed path 32, the printer 30 further includes an emitter 76, a sensor (or detector) 78 and a main logic board 80 having a signal processing system 82 (not shown). Although this configuration is shown in use with labels, it could also be used with cards and other types of stock for sensing card edges and other such media features. In general, the sensor 78 can be located anywhere along the feed path 32 between the media role (on the spindles 34) and the platen 38. In the printer of FIG. 10, the sensor 78 is positioned along the feed path 32 between the guides 36 and the platen 38, while the emitter 76 is positioned in the lid or cover of the printer 30.

Figure 11:
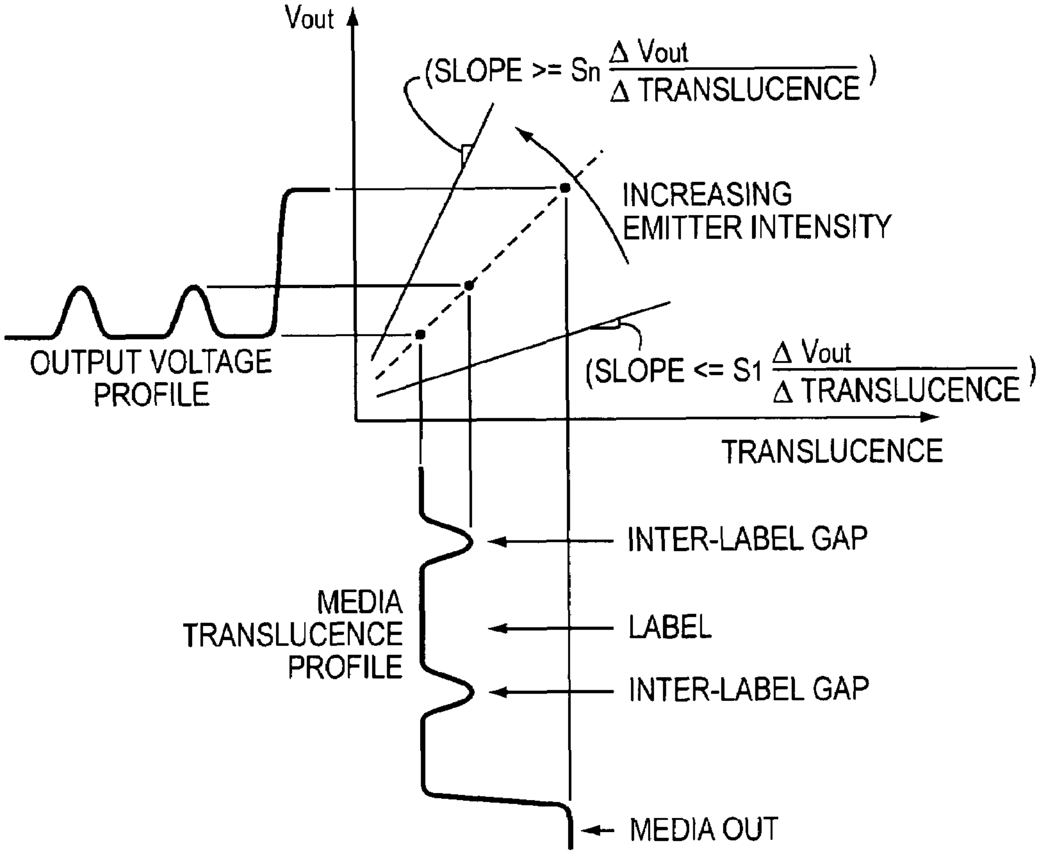
FIG. 11 illustrates an output voltage profile as a function of emitter current corresponding to the translucence profile of a given media type.

In one embodiment, the emitter 76 is a light emitting diode (LED) that emits infrared energy towards the sensor 78. The sensor 78 will produce output voltage signals in response to the opacity profile of the media 13 passing before it. For example, FIG. 11 illustrates an output voltage profile of the sensor 78, as a function of emitter current (or intensity), corresponding to the translucence profile of a given media 13 moving along the feed path 32. In this example, the type of media 13 moving along the feed path 32 includes die cut labels on a continuous liner, and has three distinct opacity levels along its translucence profile: "label," "inter-label gap" and "media out." As illustrated in FIG. 11, each of these opacity levels generally corresponds to a different respective output voltage level for a given emitter intensity.

With proper adjustment of the emitter current, the media opacity profile will produce sensor output signals that can be discriminated by the signal processing system 82 on the main logic board 80. Thus, the ability of the system to vary the emitter current (intensity) of the emitter 76 provides one degree of control over producing a desired output voltage profile for a particular media 13. Additional degrees of control are achieved using the signal processing system 82, as described below.

Figure 12:
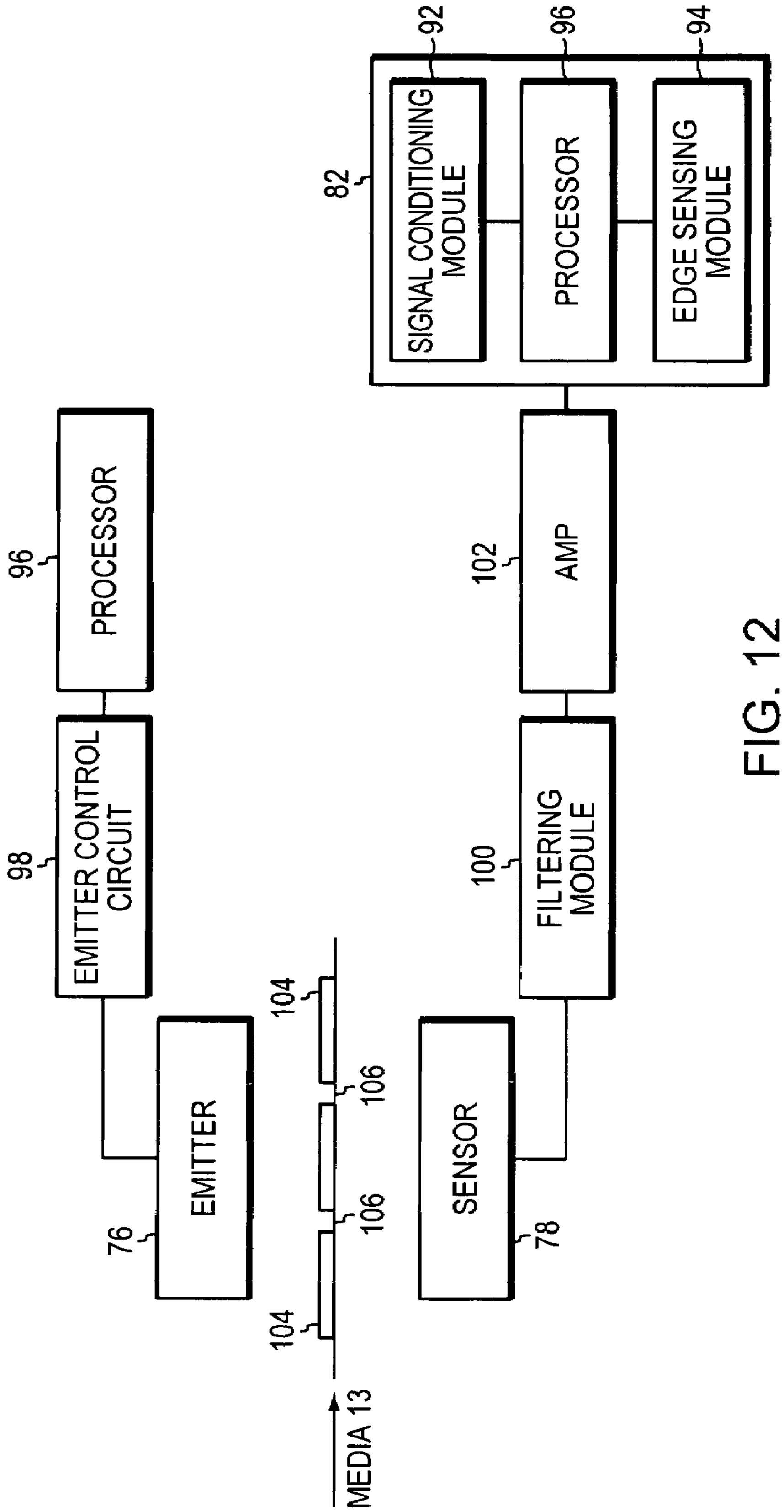
FIG. 12 show a high level block diagram of a media edge detection arrangement in accordance with an embodiment of the present invention.

FIG. 12 shows a high-level block diagram of a media edge detection arrangement 90 in accordance with an embodiment of the present invention. The arrangement 90 includes a signal processing system 82 having a signal conditioning module 92, an edge-sensing module 94 and a processor 96. Under control of the processor 96, the signal conditioning module 92 is used for normalizing the sensor output signal to a certain range of levels for detection, and the edge sensing module 94 is used to provide the logic for detecting media transition events within such normalized output signal. These aspects of the present invention are described in detail below. The processor 96 can also be used to perform a number of other functions including controlling the operation of the emitter 76 via an emitter control circuit 98. The emitter 76 is positioned to transmit a beam of light through the media 13 towards the sensor 78. The output of the sensor 78 can be fed through a filtering module 100, which may include a notch filter used for hooking signals within a certain frequency range while filtering out ambient light and other noise that might be detected. An amplifier 102 may also be included for amplifying the signal after it has been filtered. The signal is then provided to the signal processing system 82 for media edge detection processing.

For a given emitter current, the sensor 78 will produce output voltage signals in response to the opacity profile of the media 13 passing through it. The output voltage signals from the sensor 78 can be analyzed by the signal processing system

82. By setting thresholds between the signal levels that correspond to the label(s) 104 and to the inter-label gap(s) 106 (or notch(s)), the processor 96 can determine when these points in the media 13 pass through the sensor 78. In one embodiment, there is a fixed distance from the sensing point of the sensor 78 to the print line of the printhead 54. Assuming the media 13 does not slip, there are also a fixed number of motor steps between the sensor 78 and the print line as well. As a result, the processor 96 can coordinate the start of printing for a label 104 with the number of motor steps that have been made since the start of the label passed through the sensor 78.

As indicated above, the processor 96 can also be configured to vary the power to the emitter 76 as one degree of control over producing a desired output signal level from the sensor 78. There are many methods by which a microprocessor can generate and control the current, and therefore power, through an LED, including any number of Digital-to-Analog converters. One skilled in the art of electrical design will recognize one such method is to supply the LED with current from a digitally controlled DC voltage source through a fixed source resistance. Low-pass filtering a pulse-width-modulated digital control signal using a low output impedance, active filter can be used to create a digitally controlled DC voltage source. This method is assumed below, with Di, used to represent the On-to-Off duty cycle of the microprocessor control signal that is low-pass-filtered to generate the LED Current.

For the die-cut label media type, the emitter current is set to maximize the signal difference between the label 104 and inter-label gap 106 without driving the inter-label gap signal too close to the media out signal level. The signal processing system 82 then sets a threshold for the label/inter-label gap boundary between the label and inter-label gap signal levels, and sets a media out threshold between the inter-label gap and no media present signal levels. For notched opaque media, the current in the emitter 76 is set high enough for the sensor's output to be at a maximum level with no media 13 present, and low enough for the output to be at its minimum when the label 104 is present. In this case, since there is no opacity difference between a notch and media out, the processor 96 must measure the width of all notches and assume the media 13 is out when a notch exceeds the maximum specified notch width by some margin.

Figure 13:
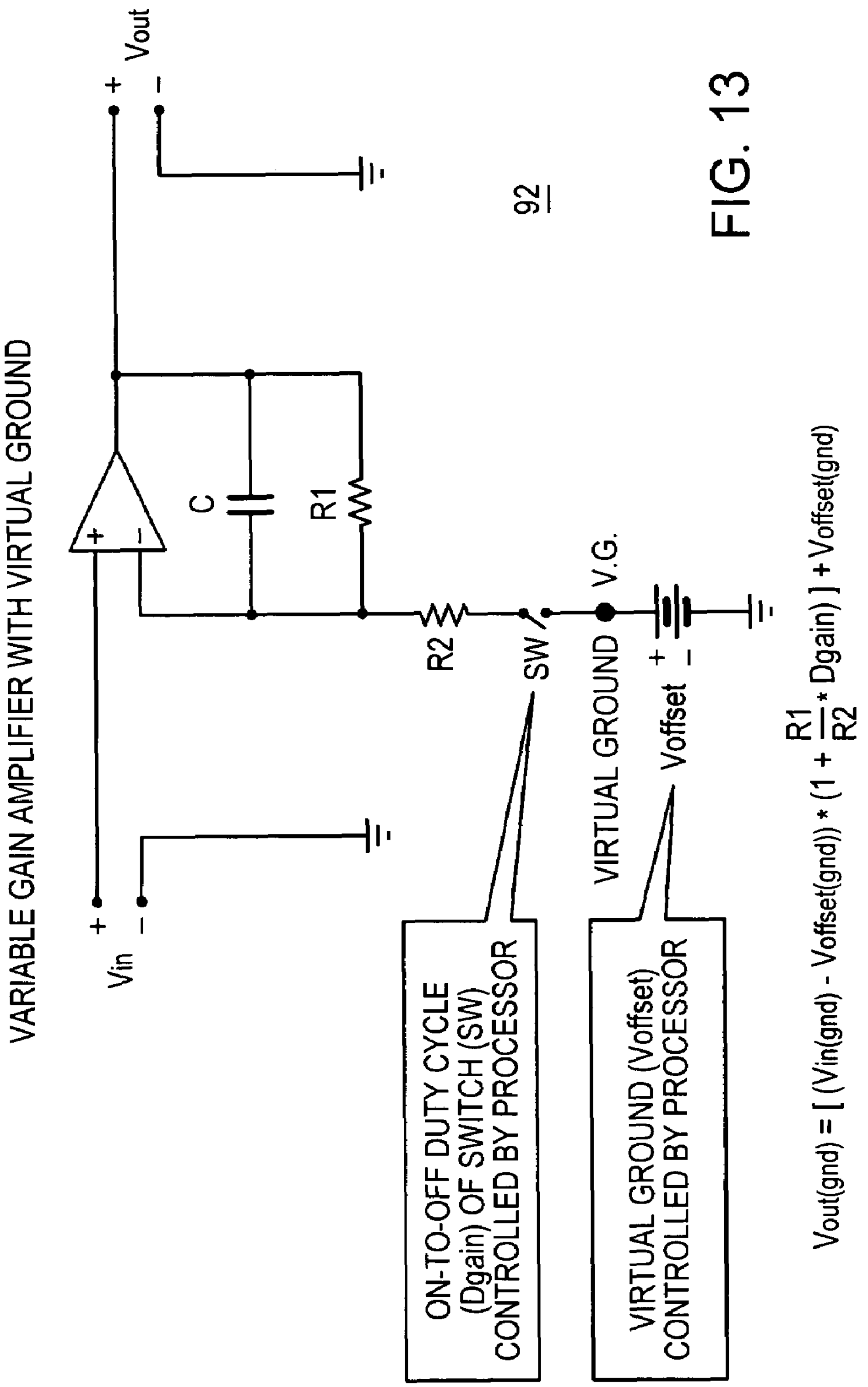
FIG. 13 is a simplified electrical schematic of the signal conditioning module of FIG. 12 in accordance with an embodiment of the present invention.

FIG. 13 shows a simplified electrical schematic of the signal-conditioning module 92 of FIG. 12, in accordance with an embodiment of the present invention. At a high level, the signal-conditioning module 92 is used for amplifying and shifting the sensor 78 output signals such that they fill and are centered within a desired portion of the input range of the processor 96's Analog-to-Digital converter (not shown). In the embodiment of FIG. 13, the signal conditioning module 92 is a variable gain amplifier with microprocessor controlled gain and DC offset adjustments. The input to the signal conditioning module, "Vin" (or $V_I$), is the output of the sensor 78 (after any preliminary filtering and/or amplification that may be performed by modules 100 and 102), and the output of the signal conditioning module, "Vout" (or $V_O$), is the input of the processor 96's Analog-to-Digital (A-to-D) converter. As would be readily understood by one of ordinary skill in the art, the output of the signal conditioning module (or amplifier) 92 shown in FIG. 13 can be represented as follows: Vout=[(Vin−Voffset)*(1+R1/R2*Dgain)]+Voffset, where Voffset (or $V_{OS}$) is the "virtual ground" offset voltage, and Dgain is the microprocessor-controlled on-to-off duty cycle of the switch (SW).

As indicated by this equation, the gain term of the amplifier shown in FIG. 13 is governed by, Gain=1+(R1/R2)*Dgain, where Dgain is the microprocessor-controlled on-to-off duty cycle of the gain-controlling PWM (Pulse-Width-Modulated) signal for the switch (SW), R1 is the feedback resistance, and R2 is the total resistance from the negative opamp input terminal to virtual ground (Voffset). Therefore, Dgain=(Gain−1)/(R1/R2). As will be described below, both Voffset and Dgain provide means for controlling the output of the signal conditioning module 92, which, in turn, provides means for controlling the inputs provided to the edge sensing module 94 and the processor 96. There are many methods by which a microprocessor can generate and control a reference voltage such as Voffset, including any number of Digital-to-Analog converters. One skilled in the art of electrical design will recognize one such method is to low-pass filter a pulse-width-modulated digital control signal using a low output impedance, active filter. This method is assumed below, with De, used to represent the On-to-Off duty cycle of the microprocessor control signal that is low-pass-filtered to generate the virtual ground reference, Voffset.

For example, using firmware on the main logic board 80, the signal-conditioning module 92 can be used to produce a desired output signal, Vout, by controlling one or both of the virtual ground offset voltage, Voffset, and the on-to-off duty cycle, Dgain, of the switch, SW. In particular, by using the processor 96 to control these two parameters (Voffset and Dgain), the signal-conditioning module (or amplifier) 92 can be used to both amplify and shift the sensor 78 output signals such that they fill and are centered within a desired portion of the input range of the processor 96's A-to-D converter. Thus, in addition to the degree of control provided by varying the intensity of the emitter 76, as described above, the present invention also provides two additional degrees of control over shaping the opacity profile seen by the edge sensing module 94 and the processor 96, for a given media 13. Using these parameters as a means for amplifying and/or shifting the opacity profile of a given media 13 to fit within a desired portion of the input range of the processor 96's A-to-D converter, allows for optimum detection of media transition events.

Figure 14:
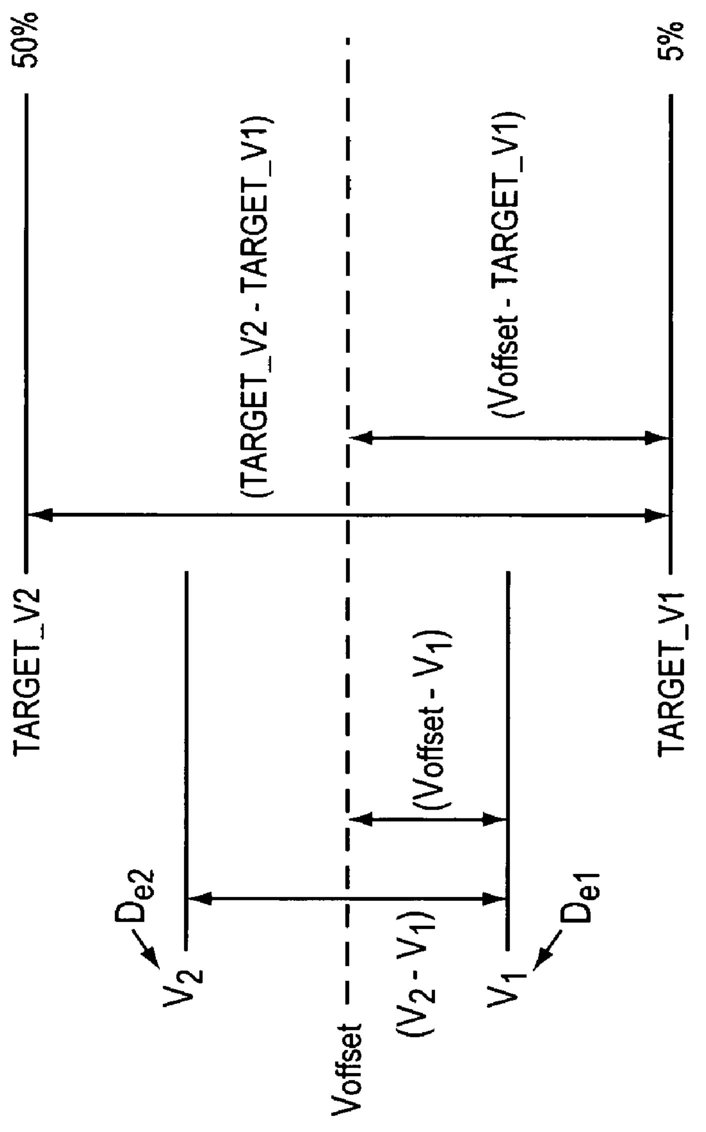
FIG. 14 illustrates how the virtual ground offset voltage and the corresponding on-to-off duty cycle that will generate this offset voltage, can be calculated for a given media, in accordance with an embodiment of the present invention.

FIG. 14 illustrates how the virtual ground offset voltage, Voffset, and the corresponding on-to-off duty cycle, Doffset, of the pulse-width-modulated signal that will generate this offset voltage, can be calculated for a given media 13, whose opacity profile is to be fit within a desired portion of the input range of the processor 96's A-to-D converter. Referring to FIG. 14, $V_1$ and $V_2$ represent actual sensor voltages taken at a label portion and an inter-label gap portion, respectively, of the media 13 prior to being processed by the signal-conditioning module 92 (i.e., these voltages correspond to Vin in FIG. 13). Target_V1 (or $V_{T1}$) and Target_V2 (or $V_{T2}$), on the other hand, represent the desired output voltages that correspond to $V_1$ and $V_2$, respectively. Stated differently, Target_V1 and Target_V2 define a desired range of output voltage levels (from the signal conditioning module 92) that fall within the operational input range of the processor 96's A-to-D converter, but that correspond to the actual input voltage spread ($V_1$-$V_2$) between the label and inter-label gap portions of the media 13.

Thus, it is a goal of the signal conditioning module 92 to take the actual input voltage spread ($V_1$-$V_2$) between the label and inter-label gap portions of the media 13, and translate it in such a way that it fits within the desired range of levels defined by Target_V1 and Target_V2. For example, in the particular embodiment of FIG. 14, the desired range of levels represented by Target_V1 and Target_V2 correspond to a range of levels that fall between five and fifty percent of the operational range of the processor 96's A-to-D converter.

With knowledge of both actual (or sampled) input values ($V_1$ and $V_2$) for the media 13, and corresponding target output values (Target_V1 and Target_V2) of the signal-conditioning module 92, the required gain and virtual ground offset voltage of the amplifier can be calculated from, Gain=(Target_V2−Target_V1)/($V_2$−$V_1$). Furthermore, due to the linear nature of the amplifier shown in FIG. 13, it is also true that Gain=(Target_V2−Voffset)/($V_2$−Voffset). Therefore, it follows that:

Gain*($V_2$−Voffset)=(Target_V2−Voffset);

($V_2$−Voffset)*Gain+Voffset=Target_V2;

Voffset−(Gain*Voffset)=Target_V2−(Gain*$V_2$);

Voffset*(1−Gain)=Target_V2−(Gain*$V_2$); and finally,

Voffset=(Target_V2−(Gain*$V_2$))/(1−Gain).

As indicated above, the gain term of the amplifier shown in FIG. 13 is governed by, Gain=1+(R1/R2)*Dgain, where: Dgain is the microprocessor-controlled on-to-off duty cycle of the pulse-width-modulated signal for the switch, SW; R1 is the feedback resistance; and R2 is the total resistance from the negative opamp input terminal to virtual ground (Voffset). Therefore, Dgain=(Gain−1)/(R1/R2).

Now that the desired virtual ground offset voltage, Voffset, has been calculated, the particular duty cycle of the PWM signal that will generate this virtual ground, Doffset, can also be found since the offset duty cycle to offset voltage relationship is linear. In particular, because this relationship is linear, it would be understood by one of ordinary skill in the art that: (Doffset−$D_{e1}$)/($D_{e2}$−$D_{e1}$)=(Voffset−$V_1$)/($V_2$−$V_1$), where $D_{e1}$ and $D_{e2}$ are the duty cycles of the offset-voltage-generating PWM signals that produce offset voltages equal to $V_1$ and $V_2$, respectively. As will be described in further detail below, in regard to FIG. 15, when the label and inter label gap voltages, $V_1$ and $V_2$, are found, so too are the corresponding virtual-ground offset-voltage duty cycles, $D_{e1}$ and $De_2$. As indicated above, the virtual-ground offset-voltage duty cycle, De, represents the On-to-Off duty cycle of the microprocessor control signal that is used to generate the virtual ground reference, Voffset.

As would be understood by one of ordinary skill in the art, the determination of $D_{e1}$ and $D_{e2}$ is made possible by the fact that Vout=Vin=Voffset independent of gain when the input voltage, Vin, is equal to the virtual ground, Voffset, for a difference amplifier as described in FIG. 13. This becomes apparent if one recalls the equation in FIG. 13, which is essentially Vout=Voffset+Gain*(Vin−Voffset), where Gain=1+(R1/R2)*Dgain. When the difference between Vin and Voffset is zero, it follows that Vout =Voffset independent of gain, because any gain times zero is still zero. Accordingly, one method of determining the virtual-ground offset-voltage duty cycle, De, corresponding to a particular input voltage, Vin, is to adjust the amplifier's virtual ground, Voffest, by adjusting, De, until no change in Vout is observed with changes in gain. Therefore, returning to the fact that (Doffset−$D_{e1}$)/($D_{e2}$−$D_{e1}$)=(Voffset−$V_1$)/($V_2$−$V_1$), it follows that:

(*D*offset−$D_{e1}$)=((Voffset−$V_1$)/($V_2$−$V_1$))*($D_{e2}$−$D_{e1}$); and finally,

*D*offset=(((Voffset−$V_1$)/($V_2$−$V_1$))*($D_{e2}$−$D_{e1}$))+$D_{e1}$.

Figure 15A:
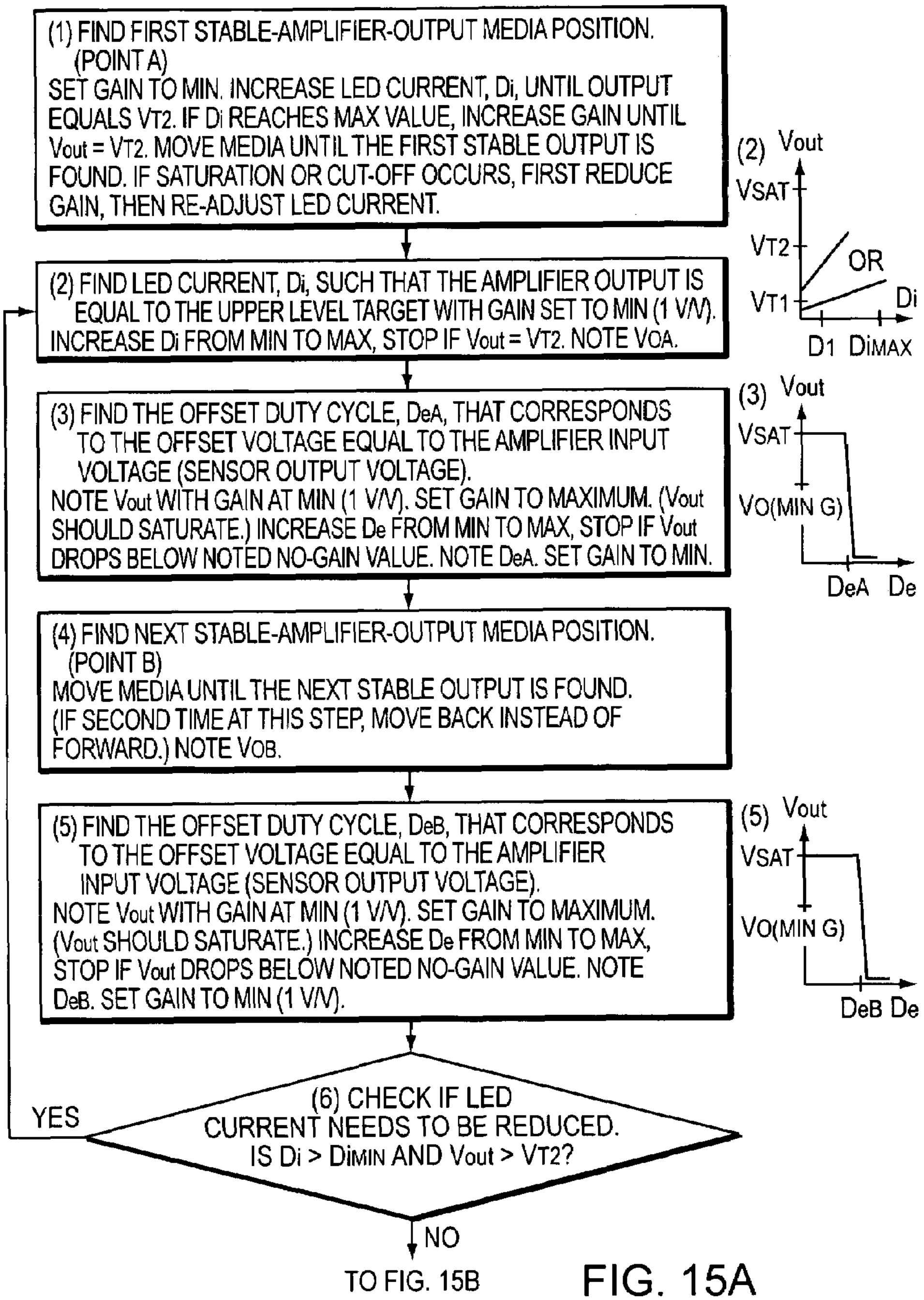
FIG. 15 shows a media sensor calibration logic diagram for determining the virtual ground offset voltage and corresponding on-to-off duty cycle that will generate this offset voltage for a given media, in accordance with an embodiment of the present invention.
Figure 15B:
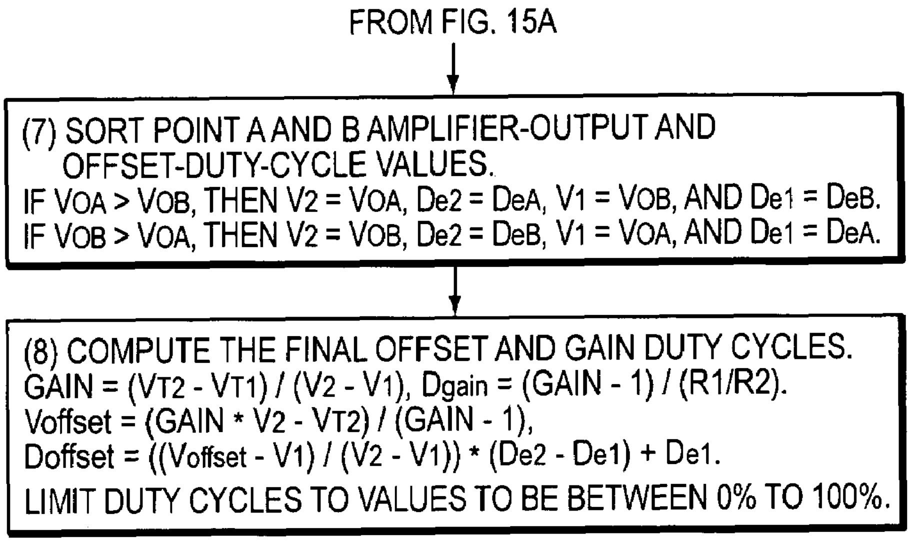

FIG. 15 shows a media sensor calibration logic diagram for determining the virtual ground offset voltage (Voffset) and corresponding on-to-off duty cycle (Doffset) that will generate this offset voltage, for a given media 13 in accordance with an embodiment of the present invention. The process begins, at Step 1, where the system finds the first stable-amplifier-output media position ("Point A") by moving the media 13 along the feed path 32 until the first stable output is found. However, before the media 13 is moved from its current position (whatever position that may be), the system sets the gain to minimum (1 V/V) and increases the LED (or emitter) current, $D_i$, until the output voltage, Vout, of the signal-conditioning module (or amplifier) 92 equals $V_{T2}$. If the emitter current, Di, reaches a maximum value before the output voltage, Vout, reaches $V_{T2}$, the system increases the gain until Vout=$V_{T2}$. This procedure allows for optimal detection of small changes in media opacity by placing the signal, Vout, in the center of the operational region of the processor 96's A-to-D converter (i.e., because, in the embodiment of FIG. 14, $V_{T2}$ was set at a level that corresponds to the 50% point of the A-to-D converter's operational region).

With the emitter current, Di, and the gain set accordingly, the media 13 is then moved along the feed path 32 until the first stable output is found. If the signal (Vout) presented at the Analog-to-Digital converter of the micro-processor 96 moves beyond the operational range of the converter, i.e. the signal goes into saturation or cut-off, the gain and then the emitter (LED) current is lowered until the signal is returned to the operational range of the A-to-D converter. The first stable output is found by moving the media 13 until a stable signal (Vout) is obtained for a distance deemed significant enough to guarantee that the edge of a label is not between the emitter 76 and the detector of the sensor 78. This Media position is declared Point A.

At Step 2, the system finds the LED Current, $D_i$, such that the amplifier output (Vout) of the signal-conditioning module 92 is equal to the upper level target value ($V_{T2}$) with the gain set to minimum (1 V/V). By setting the gain to minimum (1 V/V), the amplifier output voltage (Vout) will be equal to the amplifier input voltage (Vin), with the actual value of such voltage being a function of the LED Current, $D_i$. Accordingly, with the gain set to minimum (1 V/V), the system increases $D_i$ from a minimum value to a maximum value, stopping if Vout=$V_{T2}$. At the conclusion of this step (i.e., when Vout reaches $V_{T2}$, or when $D_i$ reaches its maximum value ($D_{iMAX}$), whichever occurs first), the system records the current output voltage (Vout) as $V_{OA}$, where $V_{OA}$ represents the amplifier 92 input voltage (sensor 78 output voltage) at Point A, with the LED Current, $D_i$, set to the value obtained in Step 2. Because it cannot yet be determined whether Point A is on a label or an inter-label gap portion of the media 13, it is not yet known whether $V_{OA}$ corresponds to $V_1$ or $V_2$, as described in regard to FIG. 14.

The process continues, at Step 3, where the system finds the offset duty cycle, $D_{eA}$, that corresponds to the offset voltage equal to the amplifier 92 input voltage ($V_{OA}$) at Point A. To do so, the system first notes Vout with the gain set to minimum (1 V/V). This value can be referred to as the no-gain value of Vout at Point A. The system then proceeds to set the gain to maximum, which should cause Vout to increase or saturate. Next, as illustrated in Step 3 of FIG. 15, the system increases the virtual-ground offset-voltage duty cycle, De, from a minimum to a maximum value, stopping if Vout drops below the previously noted no-gain value of Point A. At such time that Vout drops below the previously noted no-gain value of Point A, $D_{eA}$ is set equal to the value of De that causes Voffset to equal Vin. The system then sets the gain to minimum (1 V/V) in preparation for finding the next stable-amplifier-output media position ("Point B").

The next stable-amplifier-output media position (Point B) is found in Step 4. In one embodiment, the system initiates this step by moving the media 13 along the feed path 32 until the next stable output is found. The next stable output is found by moving the media 13 until a stable signal (Vout) is obtained for a distance deemed significant enough to guarantee that the edge of a label is not between the emitter 76 and the detector of the sensor 78. This Media position is declared Point B. If this is the second time this step is being performed, the system can move the media 13 back along the feed path 32 instead of forward. Once the next stable output is found, the system records the current output voltage (Vout) as to $V_{OB}$, where $V_{OB}$ represents the amplifier 92 input voltage (sensor 78 output voltage) at Point B, with the LED Current, $D_i$, set to the value obtained in Step 2.

The process continues, at Step 5, where the system finds the offset duty cycle, $D_{eB}$, that corresponds to the offset voltage equal to the amplifier 92 input voltage ($V_{OB}$) at Point B. To do so, the system first notes Vout with the gain set to minimum (1 V/V). This value can be referred to as the no-gain value of Vout at Point B. The system then proceeds to set the gain to maximum, which should cause Vout to increase or saturate. Next, as illustrated in Step 5 of FIG. 15, the system increases the virtual-ground offset-voltage duty cycle, De, from a minimum to a maximum value, stopping if Vout drops below the previously noted no-gain value of Point B. At such time that Vout drops below the previously noted no-gain value of Point B, $D_{eB}$ is set equal to the value of De that causes Voffset to equal Vin. The system then sets the gain to minimum (1 V/V) in preparation for finding the next stable-amplifier-output media position, if necessary.

The system then advances to Step 6 where it determines whether the LED current, $D_i$, needs to be reduced. In particular, the LED current needs to be reduced if the system determines that, at Point B, $D_i > D_{iMIN}$ and $Vout > V_{T2}$. If this is the case, then, without moving the media 13, the calibration process returns to Step 2, where the system again finds the LED Current, $D_i$, such that the amplifier output (Vout) of the signal-conditioning module 92 is equal to the upper level target value ($V_{T2}$) with the gain set to minimum (1 V/V). In particular, with the gain set to minimum (1 V/V), the system again increases the emitter current, $D_i$, from a minimum value to a maximum value, stopping if $Vout = V_{T2}$. The system then proceeds with each of the remaining steps as described above.

On the other hand, if the system, at Step 6, determines that the LED current does not need to be reduced, either because $D_i$ already equals $D_{iMIN}$ or $Vout <= V_{T2}$, the system proceeds to Step 7 where it sorts the amplifier-output and offset-duty-cycle values for Points A and B. In other words, it is at this point that the system determines whether Point A corresponds to a label and Point B to an inter-label gap, or vice versa. Specifically, if $V_{OA} > V_{OB}$, then $V_2 = V_{OA}$, $D_{e2} = D_{eA}$, $V_1 = V_{OB}$, and $D_{e1} = D_{eB}$. Or, alternatively, if $V_{OB} > V_{OA}$, then $V_2 = V_{OB}$, $D_{e2} = D_{eB}$, $V_1 = V_{OA}$, and $D_{e1} = D_{eA}$. With Points A and B properly sorted, the system proceeds to Step 8 where it computes the final virtual ground offset voltage (Voffset) and corresponding duty cycle (Doffset) in accordance with the following equations that were discussed above in regard to FIG. 14: $Gain = (V_{T2} - V_{T1})/(V_2 - V_1)$; $Dgain = (Gain - 1)/(R1/R2)$; $Voffset = (Gain * V_2 - V_{T2})/(Gain - 1)$; and $Doffset = (((Voffset - V_1)/(V_2 - V_1)) * (D_{e2} - D_{e1})) + D_{e1}$, where the duty cycles are limited to values between 0% and 100%.

Another aspect of the present invention includes using averaging techniques to determine average values for the opacity measurements taken of the media 13. These average values can, in turn, be used to achieve an even better estimate or representation of the corresponding signal levels obtained above. In addition to opacity changes in the media 13 due, for example, to the presence of labels and inter-label gaps, there is also an error signal in the media's opacity caused by the fact that most media types are not perfectly homogenous. Error signals may also be introduced by certain time-varying performance characteristics of sensor components. Such inconsistencies in the media 13 and/or performance characteristics of related sensor components create a noise signal that essentially rides along the opacity profile of the media as it moves past the sensing point of the sensor 78.

As a result, opacity measurements (e.g., $V_1$, $V_2$) made at a first point along the media 13, such as at the beginning of a calibration, may not always be representative of other points encountered along the media. In particular, if only one set of opacity measurements is used to determine the appropriate signal levels, as described above, and these measurements happen to be atypical of other points along the media 13, then the resulting gain and offset values may also be atypical of such other points. Thus, by averaging a series of opacity measurements taken at different times and at different points along the media 13, the system can achieve a better estimate or representation of what the average label opacity is, and likewise, what the average gap opacity is for the media.

Figure 16:
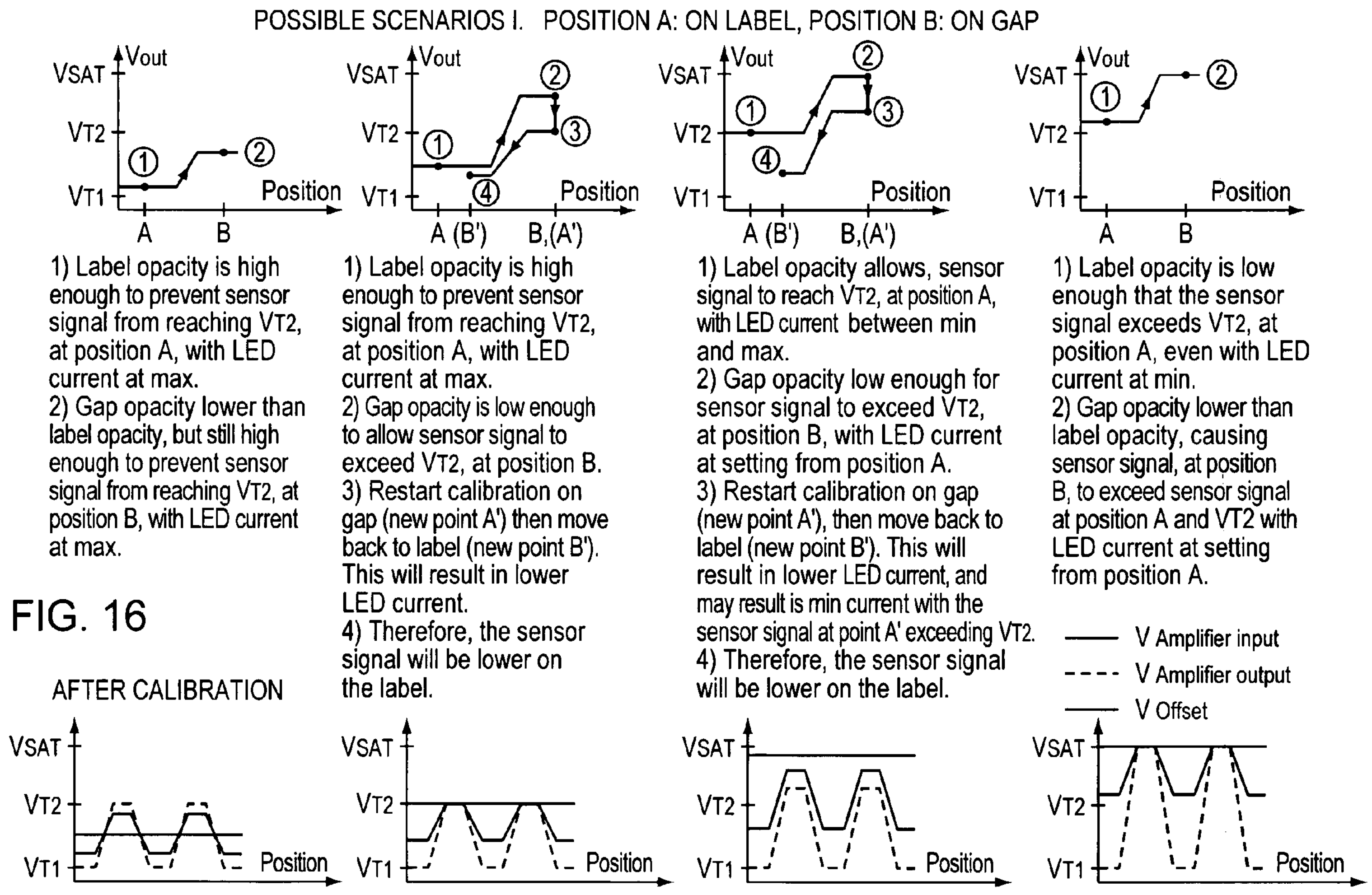
FIG. 16 illustrates a first set of possible scenarios associated with determining the virtual ground offset voltage and corresponding offset duty cycle for a given media type, where Position A is on a label and Position B is on a gap, in accordance with an embodiment of the present invention.

FIG. 16 illustrates a first set of possible scenarios associated with determining the virtual ground offset voltage (Voffset) and corresponding duty cycle (Doffset) for a given media 13, where position A is on a label and Position B is on a gap. In the first scenario of FIG. 16, the label opacity is high enough to prevent the sensor signal from reaching $V_{T2}$, at position A, with the LED Current at Max. At position B, the gap opacity is lower than the label opacity, but still high enough to prevent the sensor signal from reaching $V_{T2}$ with the LED Current at Max. Accordingly, in this scenario, the signal conditioning module (or amplifier) 92 would amplify and shift the output signal of the sensor 78 in a manner indicated by the corresponding first dashed line shown in the bottom portion of FIG. 16.

In the second scenario of FIG. 16, the label opacity is high enough to prevent the sensor signal from reaching $V_{T2}$, at position A, with the LED Current at Max, and the gap opacity is low enough to allow the sensor signal to exceed $V_{T2}$, at position B. Therefore, as indicated above, the system restarts the calibration on the gap (new point A'), and then moves back to the label (new point B'). This will result in a lower LED Current, which, in turn, will result in the sensor signal being lower on the label. Accordingly, in this scenario, the signal conditioning module (or amplifier) 92 would amplify and shift the output signal of the sensor 78 in a manner indicated by the corresponding second dashed line shown in the bottom portion of FIG. 16.

In the third scenario of FIG. 16, the label opacity allows the sensor signal to reach $V_{T2}$, at position A, with the LED Current between Min and Max, and the gap opacity is low enough for the sensor signal to exceed $V_{T2}$, at position B, with the LED Current at the setting from Position A. Thus, the system again restarts calibration on the Gap (new point A'), and then moves back to the label (new point B'). This will result in a lower LED Current, and may result in Min current with the sensor signal at point point A' exceeding $V_{T2}$. Therefore, the sensor signal will be lower on the label. Accordingly, in this scenario, the signal conditioning module (or amplifier) 92 would amplify and shift the output signal of the sensor 78 in a manner indicated by the corresponding third dashed line shown in the bottom portion of FIG. 16.

In the fourth scenario of FIG. 16, the label opacity is low enough that the sensor signal exceeds $V_{T2}$, at position A, even with LED Current is at Min. Furthermore, the gap opacity is lower than the label opacity, causing the sensor signal, at position B, to exceed the sensor signal at position A and $V_{T2}$ with the LED Current at the setting from Position A. Accordingly, in this scenario, the signal conditioning module (or amplifier) 92 would amplify and shift the output signal of the sensor 78 in a manner indicated by the corresponding fourth dashed line shown in the bottom portion of FIG. 16.

Figure 17:
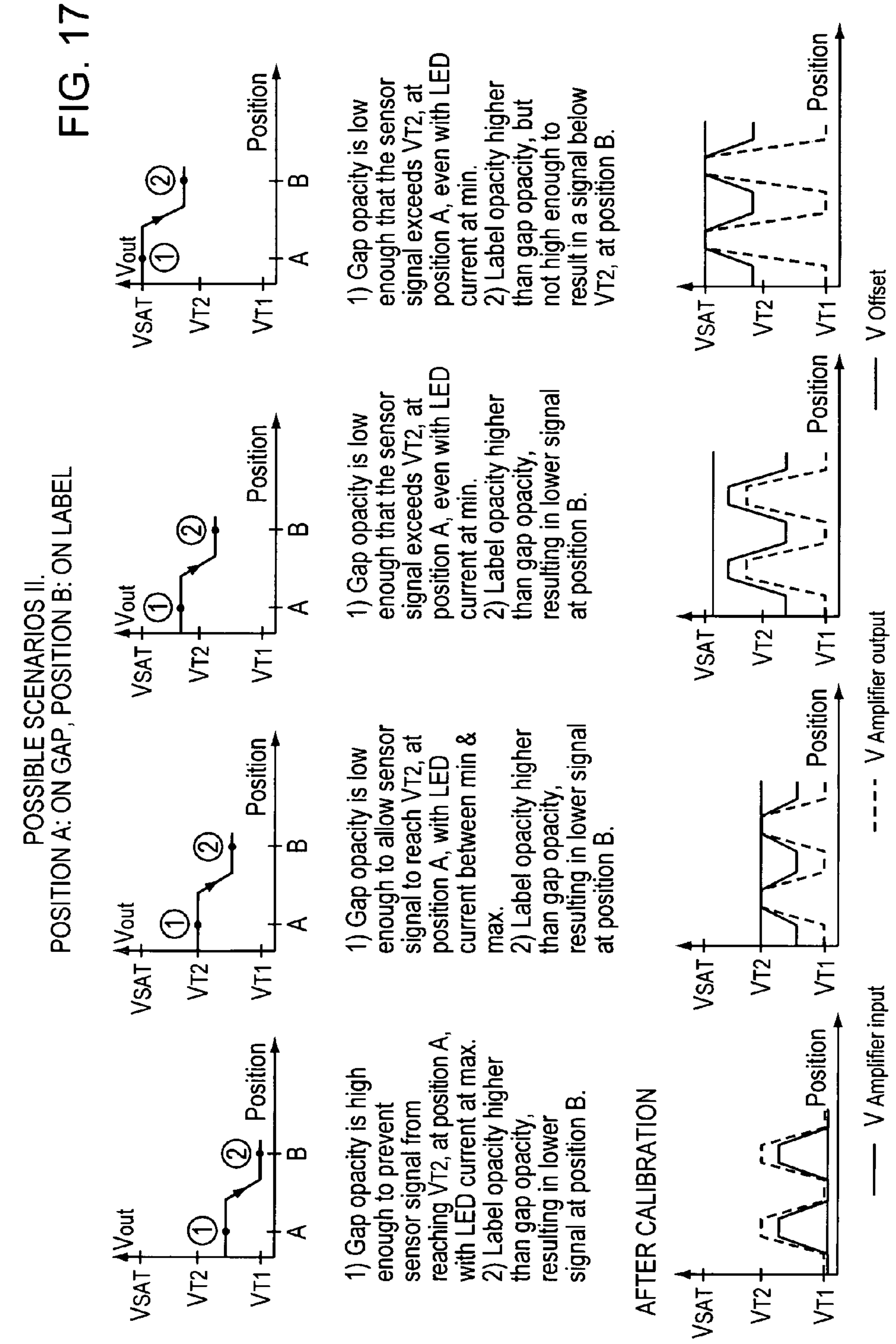
FIG. 17 illustrates a second set of possible scenarios associated with determining the virtual ground offset voltage and corresponding offset duty cycle for a given media type, where Position A is on a gap and Position B is on a label, in accordance with an embodiment of the present invention.

FIG. 17 illustrates a second set of possible scenarios associated with determining the virtual ground offset voltage (Voffset) and corresponding duty cycle (Doffset) for a given media 13, where Position A is on a gap and Position B is on a label. In the first scenario of FIG. 17, the gap opacity is high enough to prevent the sensor signal from reaching $V_{T2}$, at position A, with the LED Current at Max, and the label opacity is higher than the gap opacity, resulting in lower signal at position B. Accordingly, in this scenario, the signal conditioning module (or amplifier) 92 would amplify and shift the output signal of the sensor 78 in a manner indicated by the corresponding first dashed line shown in the bottom portion of FIG. 17.

In the second scenario of FIG. 17, the gap opacity is low enough to allow the sensor signal to reach $V_{T2}$, at position A, with the LED Current between Min & Max. Furthermore, the label opacity is higher than the gap opacity, resulting in a lower signal at position B. Accordingly, in this scenario, the signal conditioning module (or amplifier) 92 would amplify and shift the output signal of the sensor 78 in a manner indicated by the corresponding second dashed line shown in the bottom portion of FIG. 17.

In the third scenario of FIG. 17, the gap opacity is low enough that the sensor signal exceeds $V_{T2}$, at position A, even with the LED Current at Min. As also shown in this scenario, the label opacity is higher than the gap opacity, resulting in a lower signal at position B. Accordingly, the signal conditioning module (or amplifier) 92 would amplify and shift the output signal of the sensor 78 in a manner indicated by the corresponding third dashed line shown in the bottom portion of FIG. 17.

In the fourth scenario of FIG. 17, the gap opacity is again low enough that the sensor signal exceeds $V_{T2}$, at position A, even with LED Current at Min. Furthermore, the label opacity is higher than the gap opacity, but not high enough to result in a signal below $V_{T2}$, at position B. Accordingly, in this scenario, the signal conditioning module (or amplifier) 92 would amplify and shift the output signal of the sensor 78 in a manner indicated by the corresponding fourth dashed line shown in the bottom portion of FIG. 17.

As with the self-calibrating media edge sensor arrangement described above, the present media edge detection arrangement can also be configured to operate in a black mark detecting mode (or reflective mode). For example, in one embodiment, the invention can be selectable between dual modes. In a first mode, the sensor 78 and related signal processing system 82 operate as described above, monitoring web transmissivity changes resulting from spaces between labels. In a second mode, the sensor 78 and related signal processing system 82 monitor web reflectivity changes resulting from the passage of black mark(s) 20 placed on the back side of the media 13. To add the second mode, a second emitter 79 can be located proximate the sensor 78 to illuminate the sensor side of the web 13. With the circuit in black mark detecting mode, the first emitter 76 is disabled and the second emitter 79 is energized.

As similarly illustrated previously in FIGS. 8-9, the signal level progression of the sensor 78 operates with an inverted steady state as the sensor receives the second emitter 79's output reflection from the web, causing an elevated output between black marks 20. When a black mark approaches, the resulting lowered reflection from the web is detected by the sensor 78 causing a drop in the sensor output level. In one embodiment, the opacity profile of the media 13 in the black mark (or reflective) detecting mode can be inverted so that the resulting opacity profile appears much as it would in the transmissive mode. Using the techniques described above, by again controlling one or more of the power to the emitter current, and the gain and virtual ground offset voltage of the signal conditioning module 92, the system will produce sensor output signals that can be discriminated by the signal processing system 82 on the main logic board 80.

Another aspect of the present invention includes using a collimated light source, such as a VCSEL or side emitting laser for sensing media edge detection events. The embodiments above were described primarily in the context of using an LED for the emitter 76. However, one problem with LEDs is that they do not have columnized light beams, but instead send out light that is dispersed and not focused. Because LEDs are not focused, the opening on a corresponding detector window has to be fairly wide, and as a result, the detector tends to receive a lot of ambient light and other noise. The advent of improved (e.g., lower power, less expensive) laser technology, which provides a more focused light beam, allows for improved edge detection performance with less noise and other issues related to LEDs. In some cases, this has been shown to increase edge detection accuracy by a factor of four or better.

Figure 18:
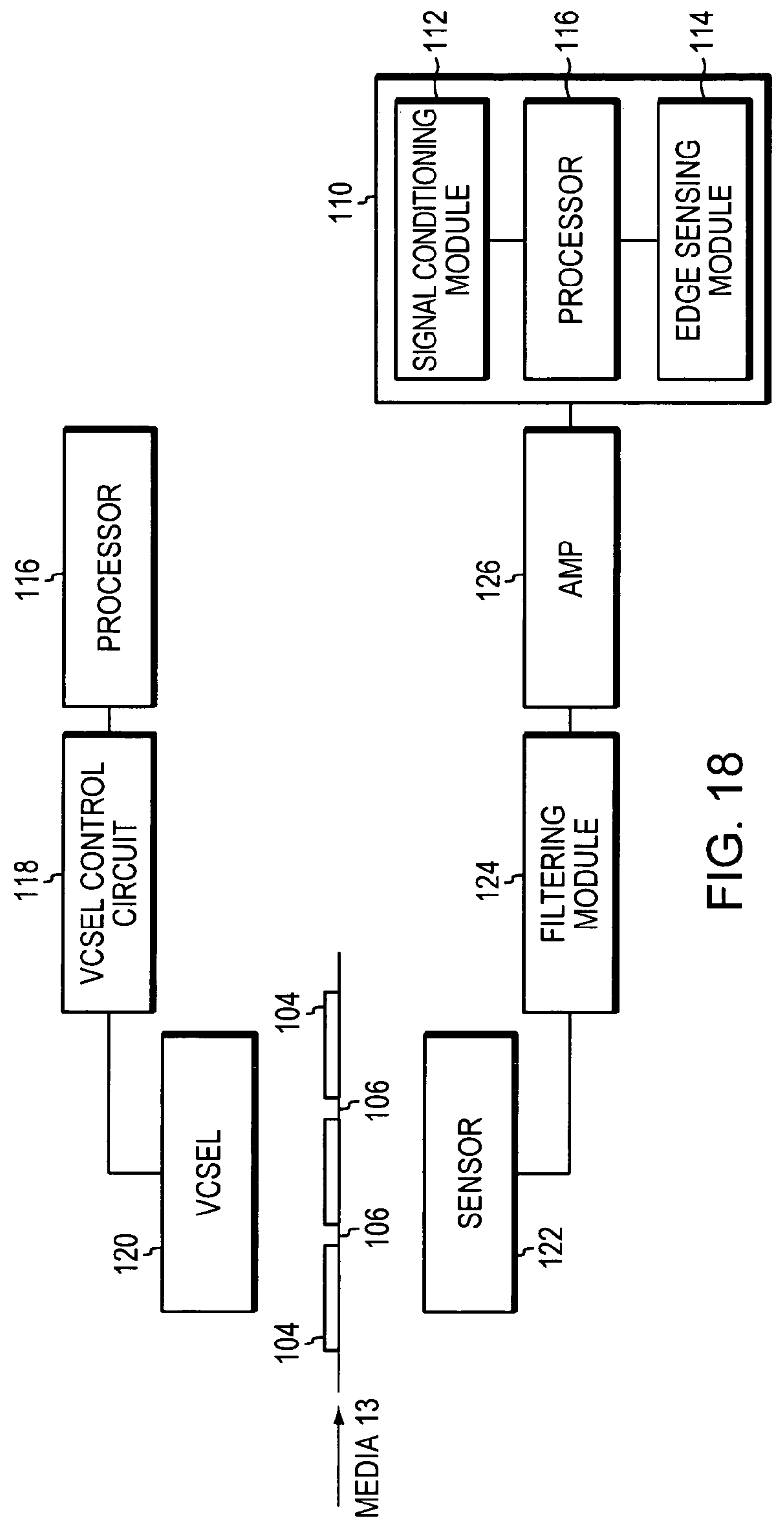
FIG. 18 shows a high level block diagram of a media edge detection arrangement using a collimated laser, such as a vertical cavity surface emitting laser (VCSEL), in accordance with an embodiment of the present invention.

FIG. 18 shows a high level block diagram of a media edge detection arrangement 108 using, for example, a VCSEL 120 in accordance with an embodiment of the present invention. The arrangement 108 includes a signal processing system 110 having a signal conditioning module 112, an edge sensing module 114 and a processor 116. The processor 116 can be used to perform a number of functions including controlling the operation of the VCSEL 120 via the VCSEL control circuit 118. It should be noted, however, that the power applied to the VCSEL 120 is typically not varied as was disclosed above with regard to varying the power to the LED emitter 76. In one embodiment, the laser 120 that is used is a model SFH9210 VCSEL with reflective transmitter manufactured by Osram. As shown, the VCSEL 120 is configured to transmit a beam of infrared light through the media 13 towards the sensor 122.

The output signal of the sensor 122 can be fed through a filtering module 124, which may include a notch filter used for hooking signals within a certain frequency range while filtering out ambient light and other noise that might be detected. An amplifier 126 may also be included for amplifying the signal after it has been filtered. The signal is then provided to the signal processing system 110, where the signal conditioning module 112 is used to normalize the signal to a certain range of levels for detection. In one embodiment, the signal conditioning module 112 adjusts the signal to about sixty percent of its input level before presenting the normalized signal to the edge sensing module 114. The edge sensing module 114 can then be used to determine various transition events associated with the media 13, as described above. For example, using the techniques above, the edge sensing module 114 can be used to determine a label signal level and an inter-label gap signal level for the media 13, which, in turn, can be used to set an appropriate threshold for detecting the edge of a label.

As with the other embodiments described above, it should be noted that the VCSEL 120 and corresponding sensor 122 can be configured to operate on either side of the media 13 for a given application. Similarly, the VCSEL 120 can also be configured to operate in a reflective mode, where a receiver/sensor (not shown) is located adjacent or integral to the VCSEL for receiving return signals reflected off of one side (e.g., the back) of the media 13. In yet another embodiment, a plurality of sensors 122 could be positioned along one side of the media 13 and the VCSEL 120 could be configured to move back and forth along the media path to find notches, black strips and other identifying marks on a label.

Figure 19:
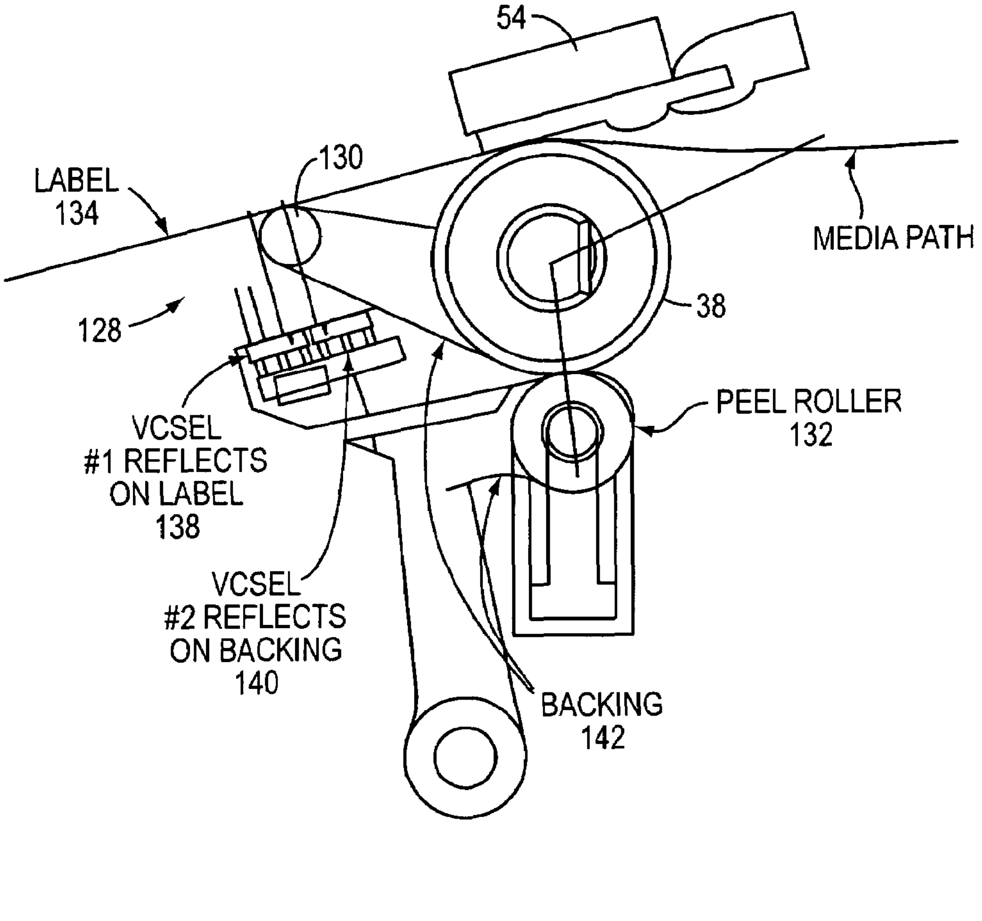
FIG. 19 illustrates a peel bar assembly that includes a media edge detection arrangement in accordance with an embodiment of the present invention.

Although the various embodiments described above have been discussed with regard to sensing where the edge of a label is for aligning the printer or the printhead with the label so as to have proper registration and data on the label when printed, it is understood that these techniques have various other uses within the printer. This includes any situation where there is a need to detect that a label is present. For example, some printers include a peel bar assembly such as illustrated in FIG. 19, which allows a label to be peeled after it has been printed and presented to a user in a peeled state. The assembly 128 includes a peel bar 130 in communication with the liner or backing of the media and a peel roller 132 in communication with the platen 38. In the peel mode, the media with the label is fed over the peel bar and the liner is fed between the platen 38 and peel roller. When the media is advanced by the platen, the liner or backing is separated from the label 134, and the label is presented to the user.

In this particular instance, it is typically not advisable for the the printer to print a next label until the user has removed the previous label. Otherwise, the leading label may drop to the floor or adhere to the printer. This may also be a problem for non-label media. For example, a printer may be used to print on continuous media such as to print receipts that can either be cut, partially cut, or torn off after printing. It may be desirable to not print a next receipt until the leading receipt is removed. Further, some printers use linerless media that has an adhesive on the back surface, which call stick to the printer or fall and stick to the floor if not removed prior to a next print.

FIG. 19 illustrates an embodiment of the present invention that can eliminate such concerns. Specifically, the embodiment includes a sensor 136 that is either part of or adjacent to the peel assembly. The sensor is directed in front of the peel bar 130 for sensing whether a label is present. In one embodiment, the sensor may include an LED or a collimated light source, such as a side emitting laser, a VCSEL or similar laser system, that directs light to a position in front of the peel bar. The sensor may further include a light receiver. When a label is present, light from the light source is reflected from the label to the sensor. Once the label is removed, the sensor no longer senses the reflected light. This sensor indication can be monitored by the print controller to thereby determine when the label is removed. This could be similarly used in non-label media applications such as receipt printers and a printer that usese linerless media.

FIG. 19 illustrates a particular example in which the sensor comprises two sensors, 138 and 140, respectively. One of the sensors 138 is directed toward a position in front of the peel bar 130 to sense the presence of a label. The other sensor 140 is directed at the liner or backing material as it feeds from the peel bar 130 to the peel roller 132. In this configuration, the sensors may monitor both the presence of label in front of the peel bar and the liner or backing material. The sensor 138 indicates when a label is present.

The sensor 140 can have several purposes. For example, it can be used to determine if there has been a problem with peeling of a label. If a label does not peel properly from the liner, it will continue to feed with the liner toward the peel roller. When the label travels past the sensor 140, the sensor will note a change in opacity and signal to the print controller that there is a jam or malfunction.

In addition or alternatively, the sensor 140 could also be used automatically to sense a peel mode configuration of the printer. Specifically, most printers are configured to either peel or not peel the liner or backing from the label. Some printers require that the user actively feed the liner or backing over the peel bar and through the peel roller, while other printers provide flip down peel bar mechanism that are activated by the user to place the printer in peel mode. Unfortunately, with most of these conventional systems, the user must manually input to the printer to operate in a peel mode configuration. In the present invention, however, the sensor 140 can be used to sense when liner or backing material is present between the peel bar and peel rollers and automatically relay to the printer controller that the printer is in peel mode.

In yet another additional or alternative embodiment, either one or both or possibly several sensors, 138 and 140, can be used by the printer to ensure that the user has properly installed the media. For example, the sensor or sensors 140 could be placed along the intended feed path of the liner or backing when in the peel mode. If the user has indicated that he/she is using the printer in the peel mode, these sensors can provide information to the printer controller to ensure that the media has been properly fed over the peel bar and the peel rollers.

The sensors 138 and 140 may also be used to relay information concerning the labels and or liner or backing material. Specifically, the labels may include information on the back of the label that is machine readable, such as marks, bar codes, etc., that can be detected for read by sensor 138 and relayed to the printer controller when the label is peeled. Similarly, the liner could include information on a top surface that is visible when the label is peeled away. This information can be detected or read by the sensor 140 and relayed to the printer controller.

As illustrated in FIG. 10, a sensor, 76 and 78, may be located in the printer housing at a location between the roll of media and the printhead. This sensor or series of sensor may also be used to determine the type of media located in the printer. For example, the sensor may sense transitions beteen label and liner and relay to the print controller that the media is linered label stock. The printer might use this information to place the printer in peel mode.

As mentioned above, the embodiments may use a collimating light source such as a side emitting laser or VCSEL. As illustrated in FIG. 19, the light source and sensors for detecting the presence of a label may be located either outside or near an opening of the printer. In this location, external light may affect sensor performance. The use of a collimated light source allows for use of sensors having narrower light acceptance windows, which in turn reduces the affects of ambient light on the sensors.

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

That which is claimed:

1. A system for detecting passage of transition edges of a moving web where the transition edges change the energy transmissivity of the web, comprising:

an emitter capable of emitting energy directed at the web, wherein the emitted energy is at least one of passed through or reflected by the web;

an edge sensor positioned to receive the emitted energy following interaction of the emitted energy with the web, and for providing an output signal corresponding to an energy level received from said emitter;

a reference sensor positioned to receive the emitted energy following interaction of the emitted energy with the web, and for providing an output signal corresponding to an energy level received from said emitter, wherein said reference sensor has a broader field of view than said edge sensor in the direction of the moving web;

a bias that limits the reference sensor output signal to be more than a low level and less than a high level of the edge sensor output signal; and a comparator in communication with said edge sensor and said reference sensor and receiving respective signals therefrom, said comparator determining from the signals received from said edge and said reference sensors the transition edges on the web.

2. A system according to claim 1, wherein the broader field of view of said reference sensor is formed by placing a reference sensor aperture between the web and said reference sensor and an edge sensor aperture between the web and said edge sensor;

the reference sensor aperture aligned to have a greater component of its aperture area oriented in the direction of media travel than does the edge sensor aperture.

3. A system according to claim 2, wherein the reference sensor aperture is aligned generally parallel with the direction of media travel and the edge sensor aperture is aligned generally perpendicular to the direction of media travel.

4. A system according to claim 1, wherein the bias is formed by deliberate sensor mismatching between said reference sensor and said edge sensor.

5. A system according to claim 1, wherein the bias is formed by adjusting a resistance value of a pull-down resistor connected to said reference sensor.

6. A system according to claim 1, wherein said emitter is a light emitting diode and the energy emitted by said emitter is one of infrared and visible light.

7. A system according to claim 6, wherein a current level supplied to said emitter has an inverse relationship to the reference sensor output signal.

8. A system according to claim 1, wherein the broader field of view of said reference sensor is formed by an aperture positioned between the web and said edge sensor.

9. A system according to claim 1, wherein said reference sensor and said edge sensor are located on a first side of the web and said emitter is located on a second side of the web, wherein the energy emitted from said emitter is emitted through the web towards said reference sensor and said edge sensor.

10. A system according to claim 9, further including a second emitter located proximate said reference sensor and said edge sensor, wherein energy emitted from said second emitter is reflected by the web towards said reference sensor and said edge sensor.

11. A system according to claim 1, wherein said emitter is located proximate said reference sensor and said edge sensor, wherein energy emitted from said emitter is reflected by the web towards said reference sensor and said edge sensor.

12. A system according to claim 1, wherein said comparator provides a first output when the signal provided by said reference sensor is greater than the signal provided by said edge sensor, and a second output when the signal provided by said reference sensor is less than the signal provided by said edge sensor.

13. A system according to claim 12, wherein said comparator comprises a pair of A/D converters coupled to a processor which generates one of the first output and the second output by logically comparing the outputs of the A/D converters.

14. A system according to claim 12, wherein the comparator comprises an A/D converter with a multiplexer for taking alternate readings from each of said reference sensor and said edge sensor, the A/D converter coupled to a processor which generates one of the first output and the second output by logically comparing respective reference sensor and edge sensor readings taken by the A/D converter.

15. A system according to claim 1, wherein said reference sensor is adapted to have a broader field of view than said edge sensor via a cylindrical lens positioned between said emitter and said reference sensor.

16. A method of detecting passage of transition edges of a moving web where the transition edges change the energy transmissivity of the web, said method comprising the steps of:

emitting energy from an emitter directed at the web, wherein the emitted energy is at least one of passed through or reflected by the web;

receiving the emitted energy at an edge sensor following interaction with the web, the edge sensor providing an output signal corresponding to an energy level received from the emitter;

receiving the emitted energy at a reference sensor following interaction with the web, the reference sensor providing an output signal corresponding to an energy level received from the emitter, wherein the reference sensor has a broader field of view than the edge sensor in the direction of the moving web;

biasing the reference sensor output signal to be higher than a low state of the edge sensor output signal and less than a high state of the edge sensor output signal; and determining from the output signals of the edge sensor and the reference sensor the transition edges on the web.

17. A method according to claim 16, wherein the reference sensor is adjusted to have a broader field of view with respect to the media path than the edge sensor by covering the reference sensor with a reference sensor aperture and covering the edge sensor with an edge sensor aperture.

18. A method according to claim 17, wherein the reference sensor aperture is aligned generally parallel with the direction of media travel and the edge sensor aperture is aligned generally perpendicular to the direction of media travel.

19. A method according to claim 16, wherein said determining step comprises using a comparator in communication with said edge sensor and said reference sensor, said comparator configured for receiving respective signals therefrom.

20. A method according to claim 19, wherein said comparator provides a first output when the signal provided by said reference sensor is greater than the signal provided by said edge sensor, and a second output when the signal provided by said reference sensor is less than the signal provided by said edge sensor.

21. A method according to claim 20, wherein said comparator comprises a pair of A/D converters coupled to a processor which generates one of the first output and the second output by logically comparing the outputs of the A/D converters.

22. A method according to claim 16, wherein the biasing of the reference sensor output signal comprises adjusting the value of a pull-down resistor of the reference sensor output.

* * * * *